United States Patent
Tanaka et al.

(10) Patent No.: US 8,170,415 B2
(45) Date of Patent: May 1, 2012

(54) PHYSICAL WIRING CONTROL DEVICE, PHYSICAL WIRING CONTROL METHOD, AND COMPUTER PRODUCT

(75) Inventors: Toshiki Tanaka, Kawasaki (JP); Kouichirou Amemiya, Kawasaki (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 798 days.

(21) Appl. No.: 11/350,878

(22) Filed: Feb. 10, 2006

(65) Prior Publication Data

US 2007/0121577 A1    May 31, 2007

(30) Foreign Application Priority Data

Oct. 31, 2005  (JP) ................. 2005-317490

(51) Int. Cl.
*H04J 14/00* (2006.01)
(52) U.S. Cl. ............... 398/45; 398/57; 398/49; 398/51; 398/54
(58) Field of Classification Search ............. 398/45, 398/50, 56, 51, 54, 12, 57, 49, 46; 370/351
See application file for complete search history.

(56) References Cited

U.S. PATENT DOCUMENTS

| | | | | |
|---|---|---|---|---|
| 5,111,323 A * | 5/1992 | Tanaka et al. | .............. | 398/52 |
| 5,867,677 A * | 2/1999 | Tsukamoto | .............. | 710/316 |
| 6,137,613 A * | 10/2000 | Ushirozawa | .............. | 398/94 |
| 6,507,873 B1 * | 1/2003 | Suzuki et al. | .............. | 709/245 |
| 6,577,625 B1 * | 6/2003 | Chiou et al. | .............. | 370/381 |
| 6,718,081 B2 * | 4/2004 | Nakajima et al. | .............. | 385/16 |
| 6,954,459 B1 * | 10/2005 | Vaidhyanathan et al. | .... | 370/392 |
| 6,957,018 B2 * | 10/2005 | Araki et al. | .............. | 398/51 |
| 7,031,296 B1 * | 4/2006 | Ryals et al. | .............. | 370/392 |
| 7,177,544 B1 * | 2/2007 | Wada et al. | .............. | 398/51 |
| 7,542,672 B2 * | 6/2009 | Kakizaki et al. | .............. | 398/12 |
| 7,706,259 B2 * | 4/2010 | Kim et al. | .............. | 370/228 |
| 7,734,175 B2 * | 6/2010 | Amemiya et al. | .............. | 398/45 |
| 7,813,640 B2 * | 10/2010 | Amemiya et al. | .............. | 398/45 |
| 7,873,275 B2 * | 1/2011 | Wada et al. | .............. | 398/54 |
| 8,041,214 B2 * | 10/2011 | Wada et al. | .............. | 398/54 |
| 2002/0122617 A1 * | 9/2002 | Nakajima et al. | .............. | 385/16 |
| 2004/0105440 A1 * | 6/2004 | Strachan et al. | .............. | 370/389 |
| 2004/0190905 A1 * | 9/2004 | Kano | .............. | 398/141 |

(Continued)

FOREIGN PATENT DOCUMENTS

JP    2000-358261    12/2000

(Continued)

OTHER PUBLICATIONS

Japanese Office Action mailed Mar. 23, 2010 and issued in corresponding Japanese Patent Application 2005-317490.

*Primary Examiner* — Kenneth N Vanderpuye
*Assistant Examiner* — Hibret Woldekidan
(74) *Attorney, Agent, or Firm* — Staas & Halsey LLP

(57) ABSTRACT

An optical power information receiving unit receives optical power information transmitted from a power monitor. When it is judged that a new IT apparatus is connected to an optical switch, an optical switch control unit controls the optical switch to connect the IT apparatus and an optical switch control device. A control device port setting unit changes an IP address of an apparatus information acquiring port based on a control device setting address of an address information storing unit. An apparatus information acquiring unit acquires an IP address of the IT apparatus.

10 Claims, 24 Drawing Sheets

U.S. PATENT DOCUMENTS

| | | | |
|---|---|---|---|
| 2005/0114548 A1* | 5/2005 | Tucciarone et al. | 709/245 |
| 2005/0196168 A1 | 9/2005 | Amemiya et al. | |
| 2005/0213971 A1* | 9/2005 | Amemiya et al. | 398/45 |
| 2005/0220100 A1* | 10/2005 | Kawabe | 370/389 |
| 2006/0215955 A1* | 9/2006 | Mitamura | 385/18 |
| 2007/0070919 A1* | 3/2007 | Tanaka et al. | 370/254 |
| 2007/0099563 A1* | 5/2007 | Amemiya et al. | 455/14 |
| 2007/0127365 A1* | 6/2007 | Tae et al. | 370/218 |

FOREIGN PATENT DOCUMENTS

| | | |
|---|---|---|
| JP | 2004-100796 | 3/2004 |
| JP | 2005-294915 | 10/2005 |

* cited by examiner

FIG.3

| APPARATUS CONNECTION PORT NUMBER | CONNECTED APPARATUS NAME | CONNECTED APPARATUS IP ADDRESS | CONTROL DEVICE SETTING IP ADDRESS |
|---|---|---|---|
| 1 | A | 10.20.100.100 | 10.20.100.150 |
| 2 | B | 10.70.170.150 | 10.70.170.200 |
| ... | ... | ... | ... |

FIG.10

| APPARATUS CONNECTION PORT NUMBER | CONNECTED APPARATUS NAME | CONNECTED APPARATUS IP ADDRESS | CONTROL DEVICE SETTING PORT |
|---|---|---|---|
| 1 | A | 10.20.100.100 | a |
| 2 | B | 10.70.170.150 | b |
| ... | ... | ... | ... |

FIG.11

| CONTROL DEVICE SETTING IP ADDRESS | CONTROL DEVICE SETTING PORT |
|---|---|
| 10.20.100.150 | a |
| 10.70.170.200 | b |
| ... | ... |

| APPARATUS CONNECTION PORT NUMBER | CONNECTED APPARATUS NAME | CONNECTED APPARATUS IP ADDRESS |
|---|---|---|
| 1 | A | 10.20.100.100 |
| 2 | B | 10.70.170.150 |
| ... | ... | ... |

FIG.16

| CONNECTED APPARATUS IP ADDRESS |
|---|
| 10.20.100.100 |
| 10.70.170.150 |
| ... |

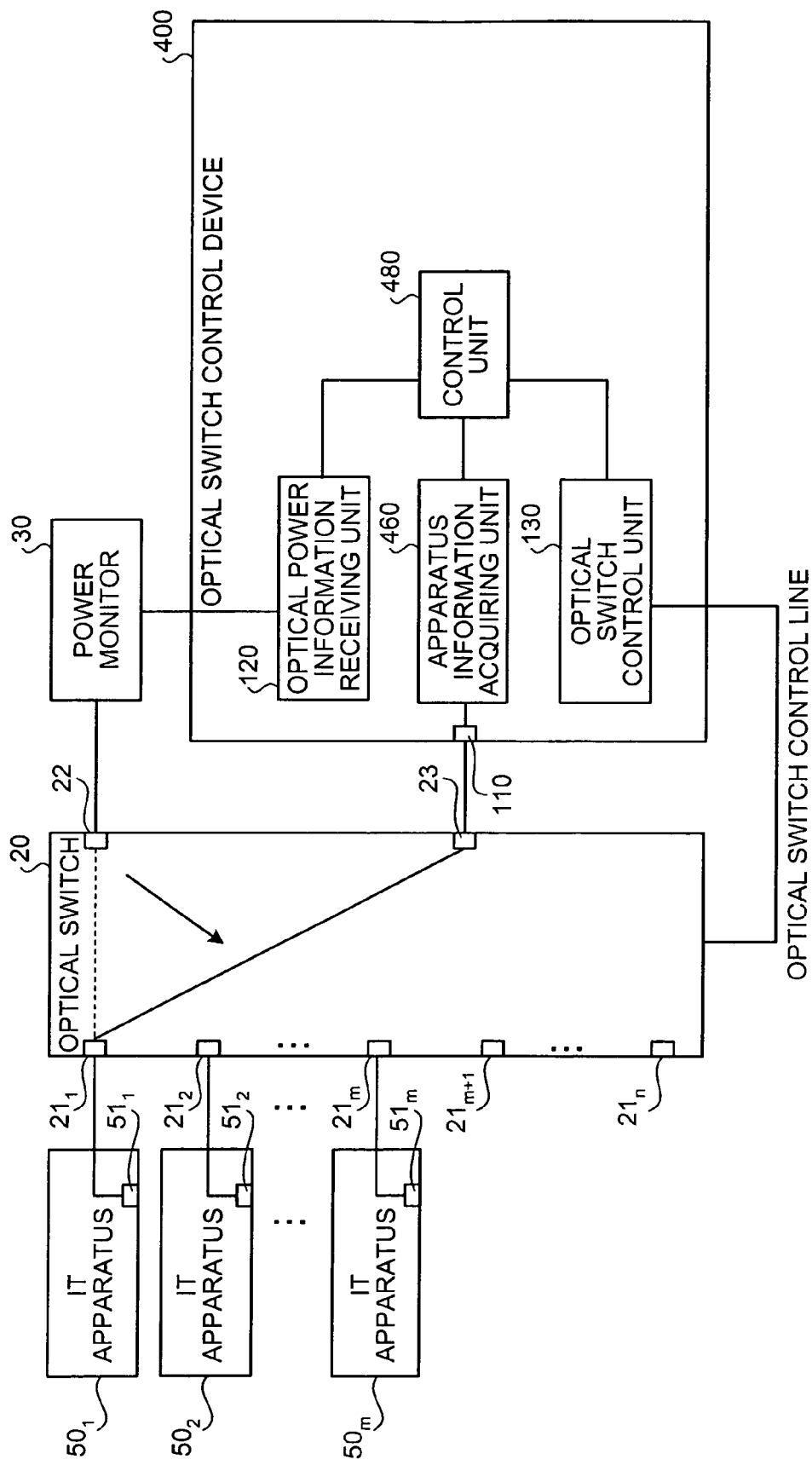

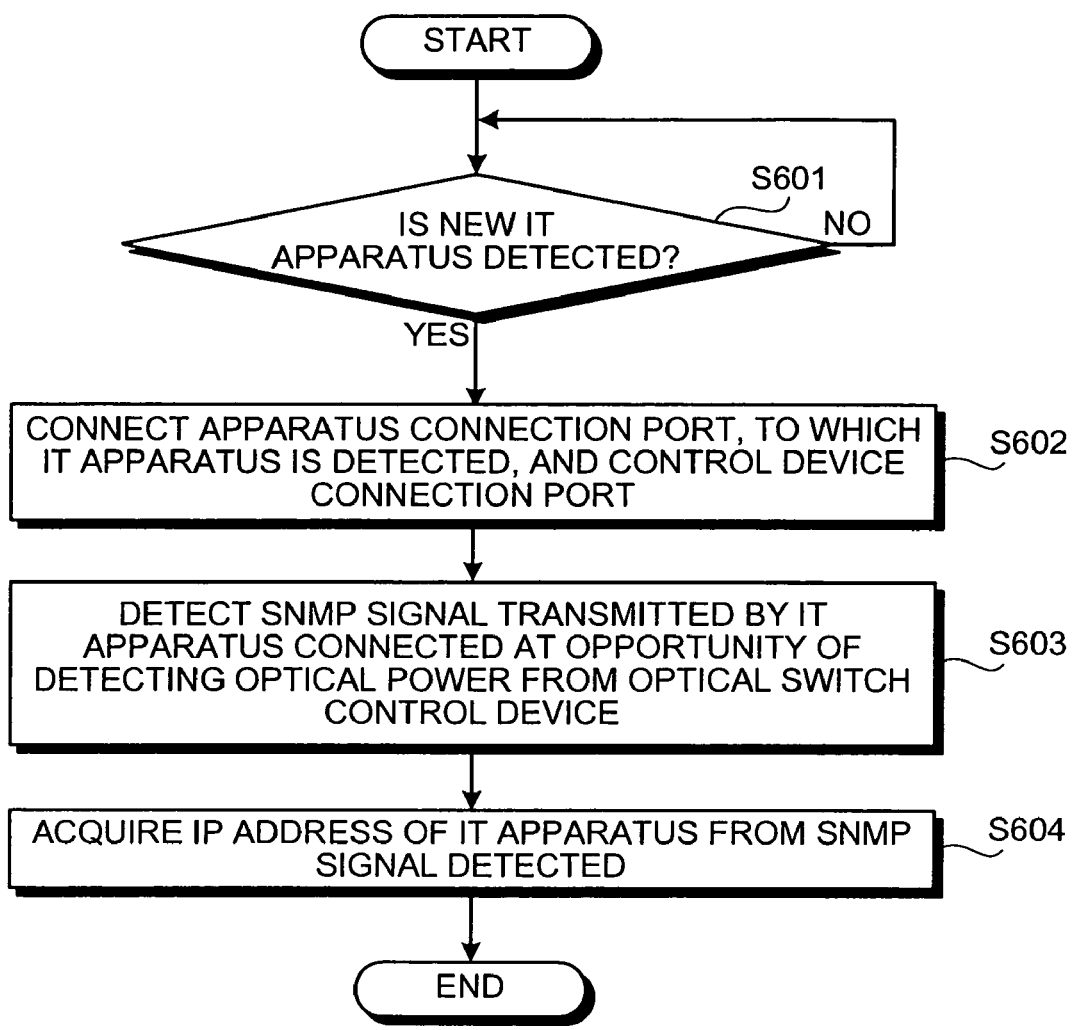

PHYSICAL WIRING CONTROL DEVICE, PHYSICAL WIRING CONTROL METHOD, AND COMPUTER PRODUCT

BACKGROUND OF THE INVENTION

1. Field of the Invention

The present invention relates to a technology for controlling a physical wiring switching device that connects a plurality of information apparatuses and switches connection among the information apparatuses.

2. Description of the Related Art

In recent years there has been a tremendous increase in transmission speed and globalization of networks. To cope with this, it has become common to use optical fibers having wide-band properties and low-loss properties as transmission media in Local Area Networks (LAN), Storage Area Networks (SAN), and the like.

Examples of networks in which LANs and SANs are mixed include the networks in data centers. In general, optical wiring in such a data center is managed using an optical wiring board called a patch panel in which optical adapters are arranged. Switching of optical paths is realized by manually inserting and pulling out fiber connectors. Wiring management is performed according to tagging to both ends of a fiber and manual recording of a connection state.

Therefore, in general, establishment and change of an optical network system or connection change of an optical fiber involve complicated work such as tagging for confirmation of apparatuses connected to the optical fiber, update of a wiring diagram, and confirmation of connection. Therefore, in such a network environment managing method, these kinds of work require a lot of man-hour.

Thus, an optical wiring switching device and a management control device therefor that can reduce time required for work by acquiring information on information apparatuses having optical communication interfaces to be optically connected and automating connection management for the information apparatuses are devised (see, for example, Japanese Patent Application No. 2004-100796).

However, recently, large-scale network systems including a plurality of different sub-networks have been increasing following the expansion of a network size. When the physical wiring switching device such as the optical wiring switching device is introduced in such large-scale network systems, if a network address of the physical wiring control device for controlling the physical wiring switching device is kept fixed, it is impossible to acquire information from information apparatuses belonging to sub-networks having addresses different from the network address.

SUMMARY OF THE INVENTION

It is an object of the present invention to at least solve the problems in the conventional technology.

According to an aspect of the present invention, a physical wiring control device that controls a physical wiring switching device that connects a plurality of information apparatuses belonging to different sub-networks to perform connection switching among the information apparatuses includes an apparatus information acquiring unit that acquires apparatus information of each of the information apparatuses.

According to another aspect of the present invention, a method of controlling a physical wiring switching device that connects a plurality of information apparatuses belonging to different sub-networks to perform connection switching among the information apparatuses includes acquiring apparatus information of each of the information apparatuses.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of an example of an address information storing unit according to the first embodiment;

FIG. 10 is a table of an example of an address information storing unit according to the second embodiment;

FIG. 11 is a table of an example of the address information storing unit at the time when an address is not set for each apparatus connection port according to the second embodiment;

FIG. 16 is a table of an example of the address information storing unit at the time when an address is not set for each apparatus connection port according to the third embodiment;

FIG. 19 is a block diagram of a constitution of an optical switch control device according to the fourth embodiment;

FIG. 20 is a flowchart of a processing procedure of connected apparatus address acquiring processing by the optical switch control device according to the fourth embodiment;

DETAILED DESCRIPTION OF THE PREFERRED EMBODIMENTS

Exemplary embodiments of the present invention are explained in detail below with reference to the accompanying drawings.

In the embodiments, an optical switch is used as a physical wiring switching device and an Internet protocol (IP) address is acquired as apparatus information.

Figure 1:
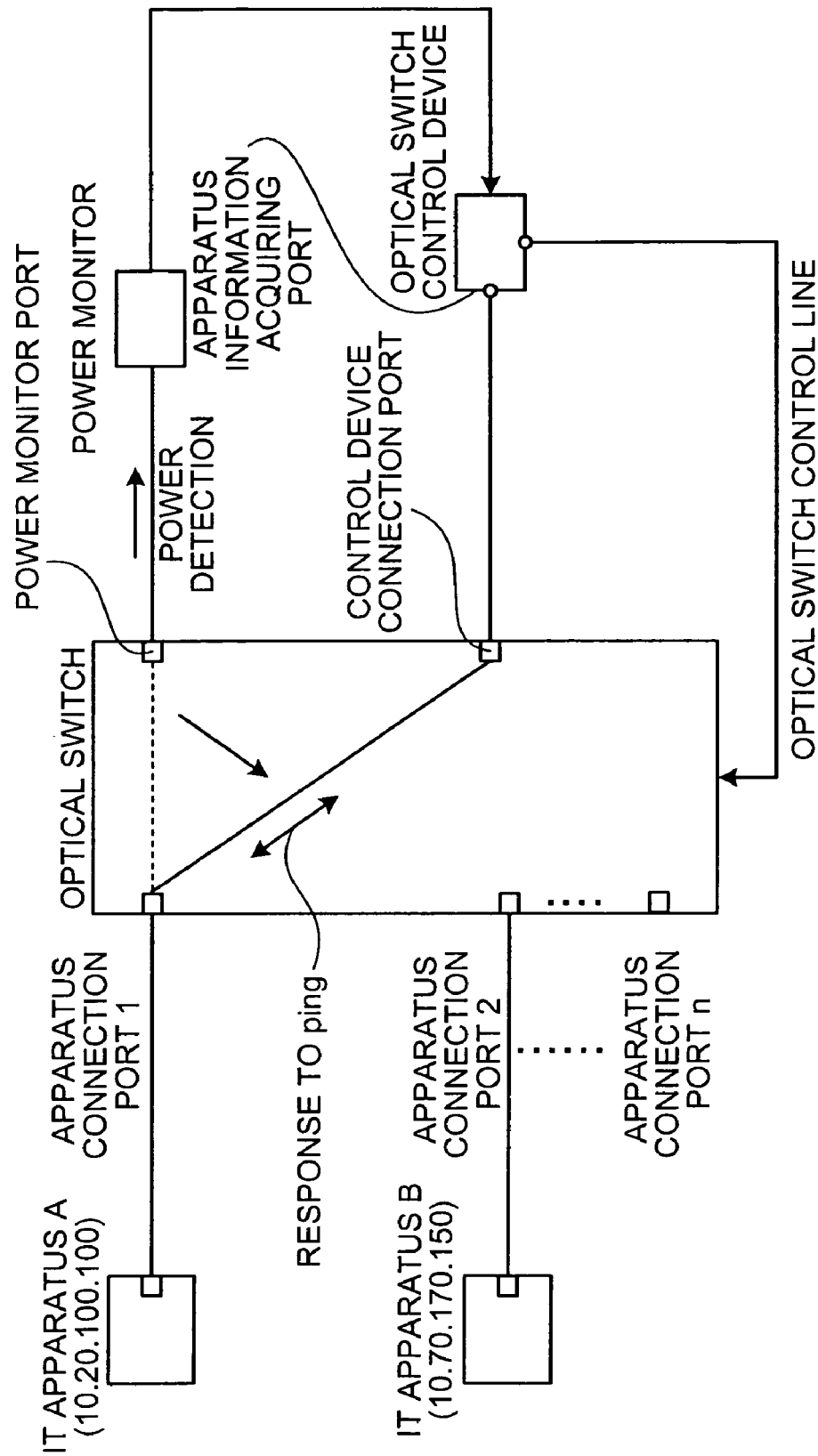
FIG. 1 is a diagram for explaining a connected apparatus address acquiring method according to a first embodiment of the present invention.

FIG. 1 is a diagram for explaining a connected apparatus address acquiring method by an optical switch control device according to a first embodiment of the present invention.

As shown in the figure, various information apparatuses (IT apparatuses) having optical interfaces are connected. An optical switch control device and a power monitor are connected to an optical switch that performs optical connection among the IT apparatuses. The optical switch control device controls connection switching inside the optical switch. The power monitor detects optical power from the IT apparatuses connected.

The optical switch includes n apparatus connection ports to which the IT apparatuses are connected, a power monitor port to which the power monitor is connected, and a control device connection port to which the optical switch control device is connected. Mutual connection of these ports is switched according to control from the optical switch control device.

When the power monitor port and the apparatus connection port are connected inside the optical switch, the power monitor detects optical power from the IT apparatus connected to the apparatus connection port and transmits optical power information to the optical switch control device.

The power monitor port is controlled to be cyclically connected to the apparatus connection ports 1 to n by the optical switch control device. Therefore, the power monitor can sequentially transmits optical power information of the IT apparatuses, which are connected to the apparatus connection ports 1 to n, to the optical switch control device.

When it is judged that a new IT apparatus is connected to any one of the apparatus connection ports based on the optical power information transmitted, the optical switch control device switches a connection destination of the apparatus connection port from the power monitor port to the control device connection port to perform address information acquiring processing. After the address information acquiring processing ends, the optical switch control device connects the apparatus connection port to the power monitor port again to resume the cyclical processing.

The address information acquiring processing, for example, at the time when an IT apparatus A is connected to the apparatus connection port 1 of the optical switch is explained. In this case, first, while the power monitor port is cyclically connected to the apparatus connection ports 1 to n, the power monitor detects optical power from the IT apparatus A and transmits optical power information to the optical switch control device at timing when the power monitor port is connected to the apparatus connection port 1.

The optical switch control device receives the optical power information of the IT apparatus A from the power monitor. Since a change in the optical power of the IT apparatus A is large compared with that in the optical power of the apparatus connection port 1 received last time, the optical switch control device judges that the new IT apparatus A is connected to the apparatus connection port 1. The optical switch control device controls the optical switch to switch a connection destination of the apparatus connection port 1 from the power monitor port to the control device connection port.

The optical switch control device acquires an address corresponding to the apparatus connection port 1 from a control device setting address stored for each of the apparatus connection ports in advance and sets the address as an IP address of an apparatus information acquiring port. The optical switch control device performs communication with the IT apparatus A via the optical switch and acquires an IP address of the IT apparatus A.

As described above, the optical switch control device according to the first embodiment appropriately changes an IP address of the apparatus information acquiring port according to the apparatus connection port, to which the IT apparatus is connected, based on the information on the control device setting address stored in advance. Thus, even when IT apparatuses on a plurality of different sub-networks are connected to the optical switch, it is possible to acquire IP addresses of the IT apparatuses.

Figure 2:
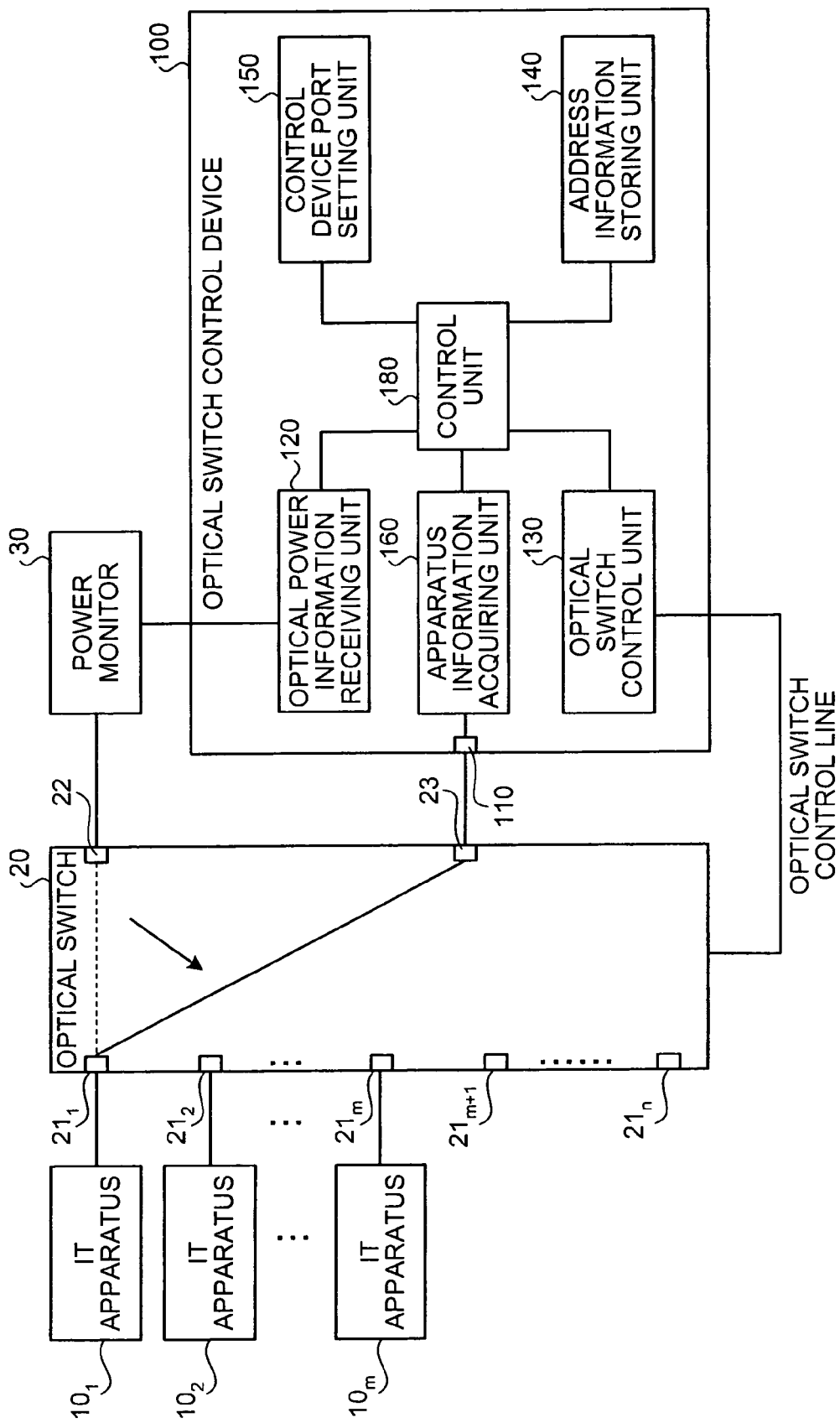
FIG. 2 is a block diagram of a constitution of an optical switch control device according to the first embodiment.

FIG. 2 is a block diagram of a constitution of the optical switch control device according to the first embodiment. As shown in the figure, an optical switch control device 100 is connected to an optical switch 20 and a power monitor 30. The optical switch control device 100 is connected to the optical switch 20 via the apparatus information acquiring port 110. The optical switch control device 100 is also connected to the optical switch 20 via an optical switch control line for controlling connection switching among ports of the optical switch 20.

The optical switch 20 is a device that includes apparatus connection ports $21_1$ to $21_n$, a power monitor port 22, and a control device connection port 23 and performs connection switching among the ports. The optical switch 20 is connected to the power monitor 30 via the power monitor port 22 and is connected to the optical switch control device 100 via the control device connection port 23. IT apparatuses $10_1$ to $10_m$ are connected to the apparatus connection ports $21_1$ to $21_m$.

The power monitor 30 is a device that detects optical power from the respective IT apparatuses $10_1$ to $10_m$ connected to the optical switch and transmits the optical power to the optical switch control device 100 as optical power information.

An optical switch control device 100 is a device that controls the optical switch 20 to perform connection switching among the IT apparatuses connected to the optical switch 20 to thereby change network topology. The optical switch control device 100 includes an apparatus information acquiring port 110 and is connected to the optical switch 20 via the port.

The optical switch control device 100 also includes an optical power information receiving unit 120, an optical switch control unit 130, an address information storing unit 140, a control device port setting unit 150, an apparatus information acquiring unit 160, and a control unit 180.

The optical power information receiving unit 120 is a processing unit that judges whether a new IT apparatus is connected to each of the apparatus connection ports $21_1$, to $21_n$. Specifically, the optical power information receiving unit 120 receives optical power information transmitted from the power monitor 30 and monitors an increase or a decrease in optical power for each of the apparatus connection ports. When an increase of a predetermined amount is detected, the optical power information receiving unit 120 judges that a new IT apparatus is connected to the apparatus connection port.

The optical switch control unit 130 is a processing unit that controls the optical switch 20 to perform connection switching among the IT apparatuses connected to the optical switch 20. For example, the optical switch control unit 130 controls the optical switch 20 to cyclically connect the power monitor port 22 to the apparatus connection ports $21_1$, to $21_n$ to thereby allow the power monitor 30 to sequentially detect optical power of the respective apparatus connection ports.

When the optical power information receiving unit 120 judges that a new IT apparatus is connected to any one of the apparatus connection ports of the optical switch 20, the optical switch control unit 130 switches a connection destination of the apparatus connection port from the power monitor port 22 to the optical switch control port 23.

The address information storing unit 140 is a storing unit that stores address information required in communicating with IT apparatuses connected to the apparatus connection ports $21_1$, to $21_n$, of the optical switch 20. FIG. 3 is a table of an example of the address information storing unit 140 according to the first embodiment. As shown in the figure, the address information storing unit 140 stores an apparatus connection port number corresponding to each of the apparatus connection ports $21_1$, to $21_n$, of the optical switch 20, a connected apparatus name indicating a name of an IT apparatus, a connected apparatus address indicating an IP address set in the IT apparatus, and a control device setting address set in the apparatus information acquiring port 110.

The address information storing unit 140 stores connected apparatus addresses and control device setting addresses corresponding to IT apparatuses connected to the respective apparatus connection ports of the optical switch 20 in advance. Thus, the optical switch control device 100 can appropriately change an IP address of the apparatus information acquiring port 110 and communicate with IT apparatuses belonging to a plurality of different networks.

The control device port setting unit 150 is a processing unit that changes an IP address of the apparatus information acquiring port 110. Specifically, when the optical power receiving unit 120 judges that a new IT apparatus is connected to any one of the apparatus connection ports of the optical switch 20, the control device port setting unit 150 acquires a control device setting address corresponding to the apparatus connection port from the address information storing unit 140 and changes the IP address of the apparatus information acquiring port 110 based on the address.

The apparatus information acquiring unit 160 is a processing unit that acquires an IP address set in an IT apparatus connected to the optical switch 20 from the IT apparatus. Specifically, the apparatus information acquiring unit 160 acquires a connected apparatus address corresponding to an apparatus connection port, to which the IT apparatus is connected, from the address information storing unit 140 and designates the connected apparatus address acquired to execute a ping command. The apparatus information acquiring unit 160 checks the IP address of the IT apparatus connected to the optical switch 20.

The control unit 180 is a processing unit that controls the entire optical switch control device 100. Specifically, the control unit 180 shifts control among functional units and exchanges data between a functional unit and a storing unit to thereby cause the optical switch control device 100 to function as one apparatus.

Figure 4:
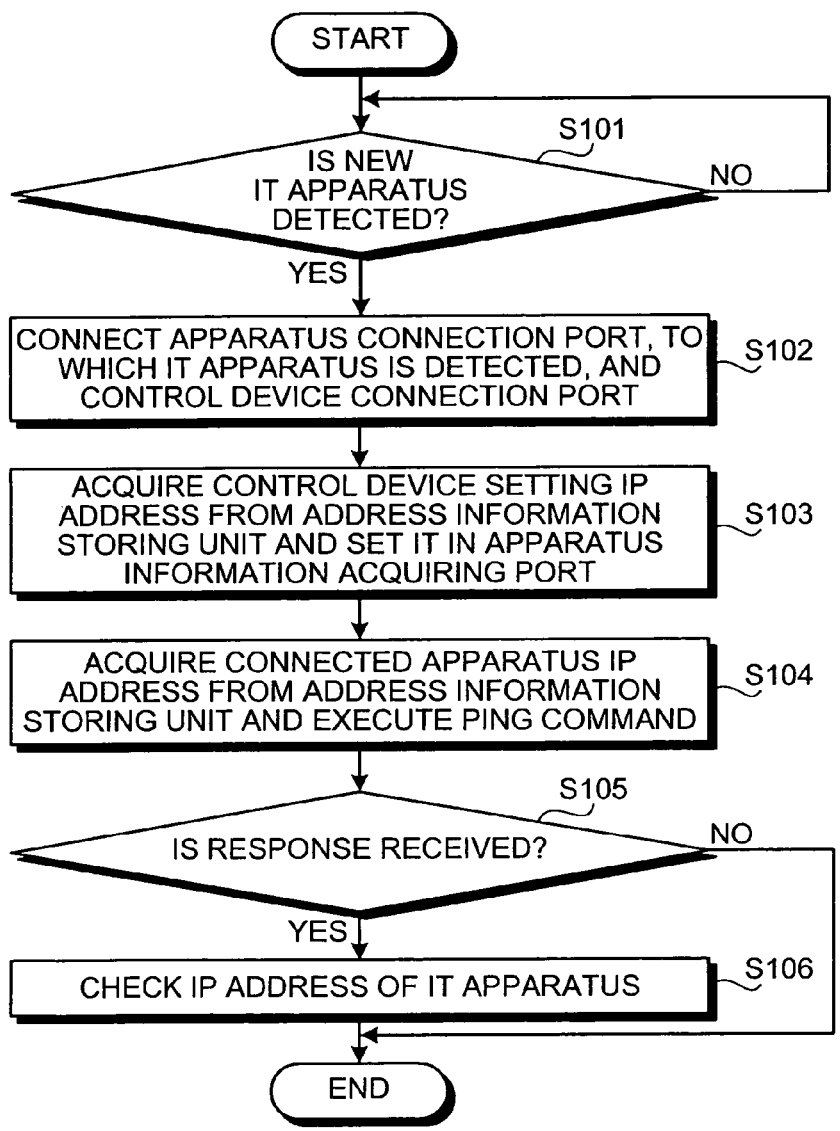
FIG. 4 is a flowchart of a processing procedure of connected apparatus address acquiring processing by the optical switch control device according to the first embodiment.

FIG. 4 is a flowchart of a processing procedure of connected apparatus address acquiring processing by the optical switch control device 100 according to the first embodiment.

As shown in the figure, in the optical switch control device 100, the optical switch control unit 130 controls the optical switch 20 to cyclically connect the power monitor port 22 to the apparatus connection ports $21_1$, to $21_n$. When the optical power information receiving unit 120 receives optical power information transmitted from the power monitor 30 and judges that a new IT apparatus is connected ("Yes" at step S101), the optical switch control unit 130 controls the optical switch 20 to connect an apparatus connection port to which the IT apparatus is connected and the control device connection port 23 (step S102).

The control device port setting unit 150 acquires a control device setting address corresponding to the apparatus connection port, to which the IT apparatus is connected, from the address information storing unit 140 and changes an IP address of the apparatus information acquiring port 110 based on the control device setting address acquired (step S103).

The apparatus information acquiring unit 160 acquires a connected apparatus address corresponding to the apparatus connection port, to which the IT apparatus is connected, from the address information storing unit 140 and designates the connected apparatus address acquired to execute a ping command (step S104).

When a response to the ping command is received ("Yes" at step S105), the apparatus information acquiring unit 160 checks an IP address of the IT apparatus based on a result of the response (step S106).

Thereafter, the optical switch control unit 130 controls the optical switch 20 to return a connection destination of the apparatus connection port, to which the IT apparatus is connected, from the control device connection port 23 to the power monitor port 22 and resumes the cyclical connection of the power monitor port 22 and the apparatus connection ports $21_1$, to $21_n$. Consequently, the processing at step S101 and the subsequent steps is repeated.

In the example explained in the first embodiment, the power monitor port 22 is cyclically connected to the apparatus connection ports $21_1$, to $21_n$. However, it is also possible that a plurality of power monitors are used and connected to the respective apparatus connection ports $21_1$, to $21_n$ in a one to one relation to detect optical power of IT apparatuses connected to the power monitors, respectively.

In the first embodiment, the address information storing unit 140 stores connected apparatus addresses and control device setting addresses in association with the respective apparatus connection ports and communicates with IT apparatuses based on such address information. However, the address information storing unit 140 can also communicate with the IT apparatuses while sequentially changing an IP address of the apparatus information acquiring port 110 based on a stored plurality of control device setting addresses without associating address information and apparatus connection ports.

Figure 5:
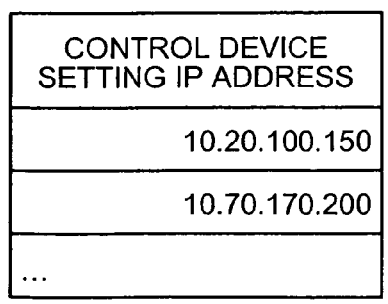
FIG. 5 is a diagram of an example of the address information storing unit at the time when an address is not set for each apparatus connection port according to the first embodiment.

FIG. 5 is a table of an example of the address information storing unit 140 at the time when an address is not set for each of apparatus connection ports according to the first embodiment. As shown in the figure, in this case, the address information storing unit 140 stores a control device setting address for each of sub-networks of IT apparatuses that are likely to be connected to the optical switch.

Figure 6:
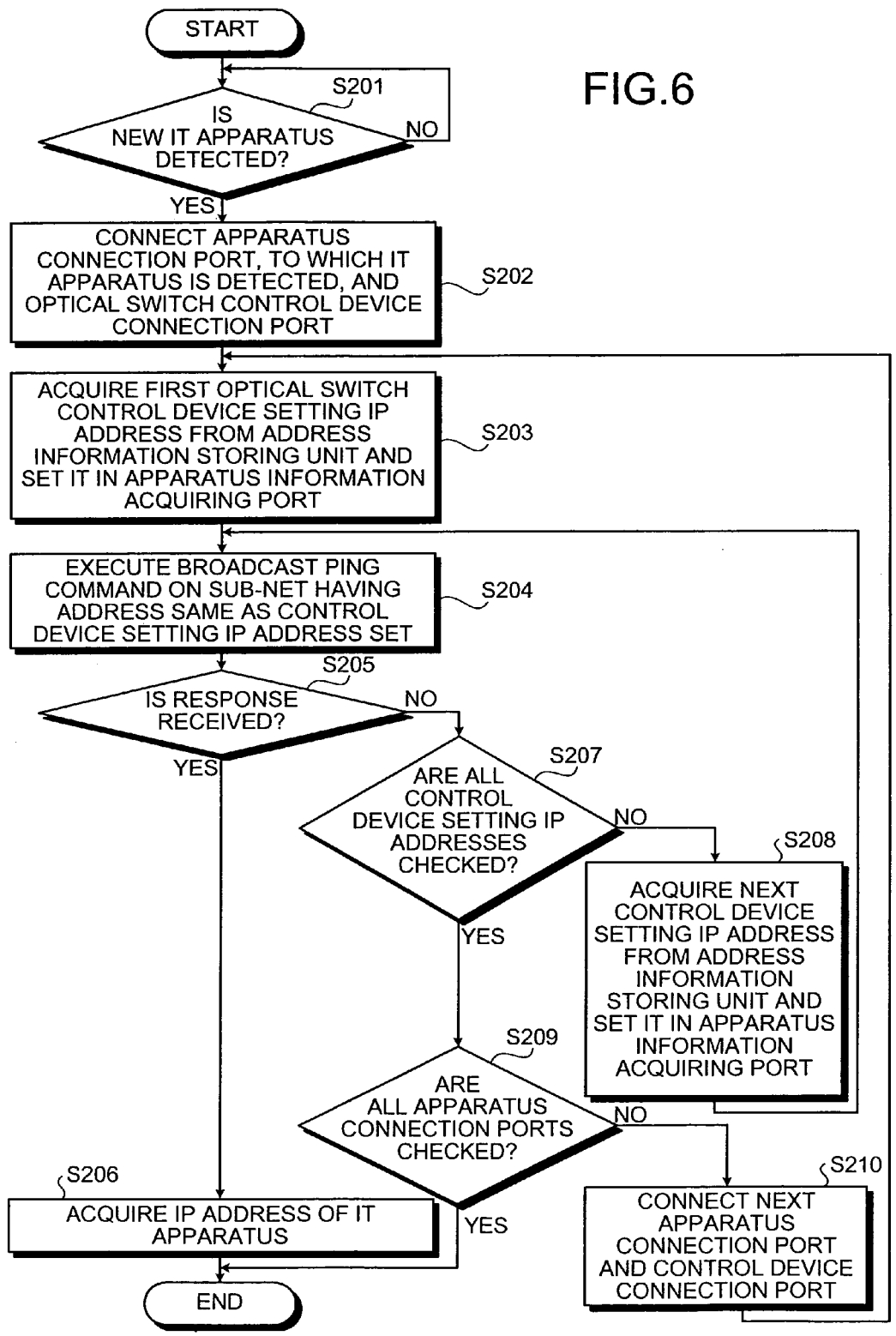
FIG. 6 is a flowchart of a processing procedure of the connected apparatus address acquiring processing at the time when an address is not set for each apparatus connection port.

FIG. 6 is a flowchart showing a processing procedure of connected apparatus address acquiring processing at the time when an address is not set for each of apparatus connection ports.

As shown in the figure, first, the optical switch control unit 130 controls the optical switch 20 to cyclically connect the power monitor port 22 to the apparatus connection ports $21_1$, to $21_n$. When the optical power information receiving unit 120 receives optical power information transmitted from the power monitor 30 and judges that a new IT apparatus is connected ("Yes" at step S201), the optical switch control unit 130 controls the optical switch 20 to connect an apparatus connection port to which the IT apparatus is connected and the control device connection port 23 (step S202).

The control device port setting unit 150 acquires a first address from control device setting addresses stored in the address information storing unit 140 and changes an IP address of the apparatus information acquiring port 110 based on the control device setting address acquired (step S203).

The apparatus information acquiring unit 160 designates a broadcast address of a sub-network same as the control device setting address set in the apparatus information acquiring port 110 and executes a broadcast ping command (step S204).

When a response to the broadcast ping command is received ("Yes" at step S205), the apparatus information acquiring unit 160 acquires an IP address of the IT apparatus based on a result of the response (step S206). On the other hand, when there is no response ("No" at step S205), the apparatus information acquiring unit 160 sequentially acquires control device setting addresses from the address information storing unit 140 to change an apparatus information acquiring port and repeats execution of a ping command on a broadcast address of a sub-network same as the address ("No" at step S207, step S208).

When all the control device setting addresses stored in the address information storing unit 140 are checked to find no response ("Yes" at step S207), the apparatus information acquiring unit 160 repeats the processing from steps S203 to S208 while sequentially switching a connection destination of the control device connection port 23 to the apparatus connection ports $21_1$, to $21_n$ (step S210).

When a response from the IT apparatus is received or when all the apparatus connection ports are checked to find no response, the optical switch control unit 130 returns a connection destination of the apparatus connection port, to which the IT apparatus is connected, from the control device connection port 23 to the power monitor port 22 and resumes the cyclical connection of the power monitor port 22 and the apparatus connection ports $21_1$, to $21_n$. Consequently, the processing at step S201 and the subsequent steps is repeated.

In this embodiment, an IP address of the apparatus information acquiring port 110 is sequentially changed to execute a ping command and, then, the apparatus connection port is switched to execute the ping command again. However, switching of the apparatus connection port may be performed earlier.

Figure 7:
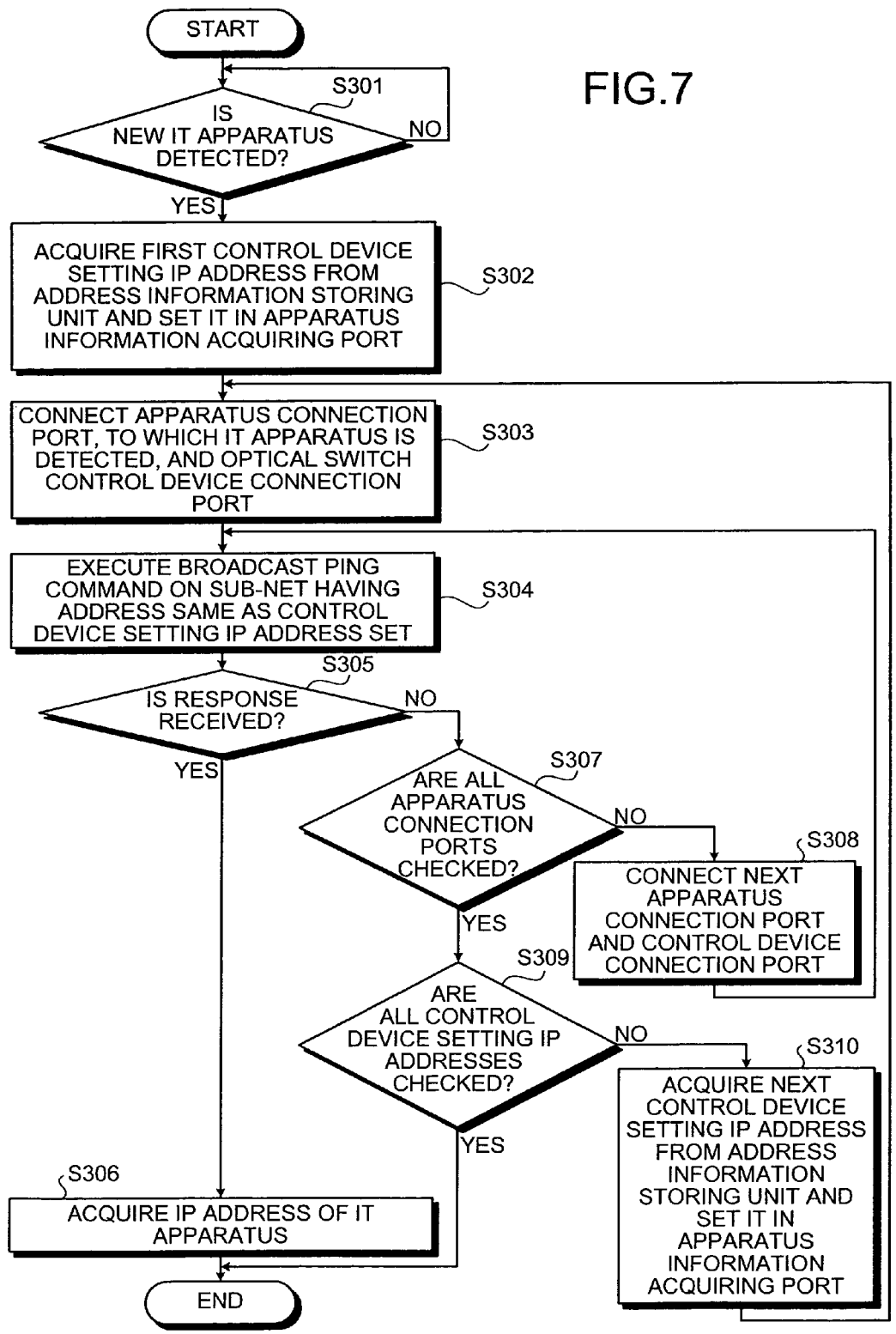
FIG. 7 is a flowchart of a processing procedure of the connected apparatus address acquiring processing at the time when judgment according to switching of an apparatus connection port is performed earlier.

FIG. 7 is a flowchart of a processing procedure of the connected apparatus address acquiring processing at the time when judgment according to switching of an apparatus connection port is performed earlier. Since processing at steps S301, S302, S303, and S304 are the same as the processing at S201, S203, S202, and S204 shown in FIG. 6, respectively, explanations of the processing are omitted.

When there is no response as a result of executing the broadcast ping command ("No" at step S305), first, the apparatus information acquiring unit 160 controls the optical switch 20, sequentially changes a connection destination of the control device connection port 23 to the apparatus connection ports $21_1$, to $21_n$, to execute the broadcast ping command on the IT apparatus, and attempts to acquire an IP address (steps S307 and S308). When there is no response from the IT apparatus even if the connection destination is switched to all the apparatus connection ports, the apparatus information acquiring unit 160 sequentially changes an IP address of the apparatus information acquiring port 110 based on the control device setting addresses stored in the address information storing unit 140 and repeats execution of the broadcast ping command while switching the apparatus connection ports again (steps S307 to S310).

The control device port setting unit 50 changes an IP address of the apparatus information acquiring port 110 based on the control device setting addresses stored in the address information setting unit 140. Thus, the optical switch 100 can communicate with IT apparatuses belonging to a plurality of different networks.

As described above, in the first embodiment, the optical power information receiving unit 120 receives optical power information transmitted from the power monitor 30. When the optical power information receiving unit 120 judges that a new IT apparatus is connected to the optical switch 20, the optical switch control unit 130 controls the optical switch 20 to connect the IT apparatus and the optical switch control device 100. The control device port setting unit 150 changes an IP address of the apparatus information acquiring port 110 based on the control device setting addresses of the address information storing unit 140. The apparatus information acquiring unit 160 acquires an IP address of the IT apparatus. Thus, even when IT apparatuses on a plurality of different networks are connected to the optical switch 20, the optical switch control device 100 can automatically acquire or check apparatus information (IP addresses) from the respective IT apparatuses.

In the explanation of the first embodiment, the apparatus information acquiring port 110 of the optical switch control device 100 is changed according to the control device setting addresses stored in the address information storing unit 140 to acquire IP addresses from IT apparatuses connected to a plurality of different sub-networks.

However, when a plurality of apparatus information acquiring ports are provided in the optical switch control device 100, addresses of sub-networks different from one another may be set in advance.

In an explanation of a second embodiment of the present invention, a port used for communication with an IT apparatus is appropriately selected from a plurality of apparatus information acquiring ports provided in the optical switch control device 100 to acquire IP addresses from IT apparatuses connected to a plurality of different sub-networks.

Figure 8:
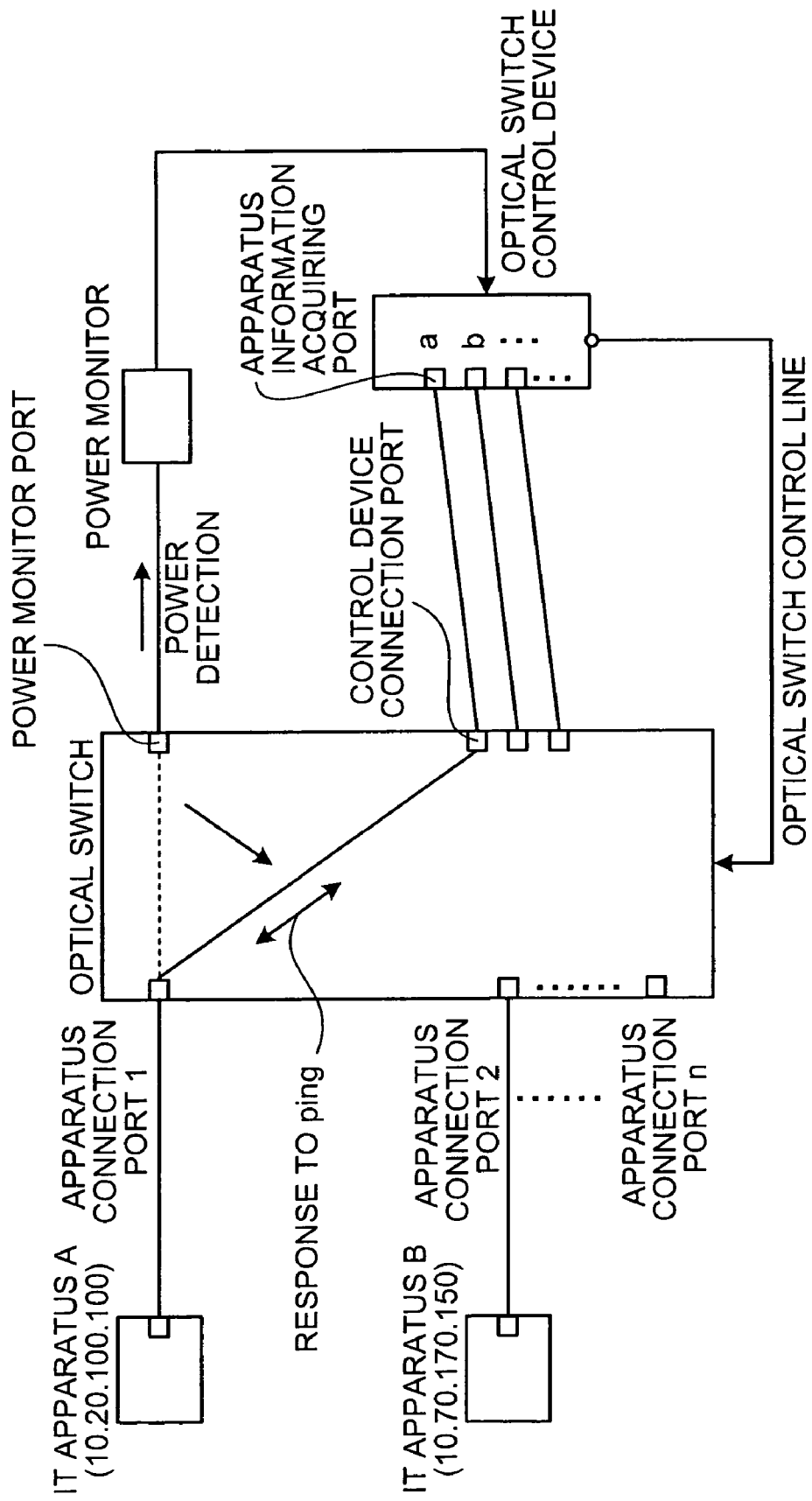
FIG. 8 is a diagram for explaining a connected apparatus address acquiring method according to a second embodiment of the present invention.

FIG. 8 is a diagram for explaining a connected apparatus address acquiring method by an optical switch control device according to the second embodiment.

As shown in the figure, the optical switch control device includes a plurality of apparatus information acquiring ports.

The apparatus information acquiring ports are connected to a plurality of control device connection ports provided in an optical switch.

When it is judged that a new IT apparatus is connected to the apparatus connection port 1 of the optical switch, the optical switch control device acquires an apparatus information acquiring port corresponding to the apparatus connection port 1 from apparatus information acquiring port information stored for each of the apparatus connection ports in advance.

The optical switch control device controls the optical switch to switch a connection destination of the apparatus connection port 1 from a power monitor port to a control device connection port connected to the apparatus information acquiring port acquired. The optical switch control device communicates with the IT apparatus A via the optical switch and acquires an IP address of the IT apparatus A.

In this way, the optical switch control device according to the second embodiment changes an apparatus information acquiring port according to an apparatus connection port, to which an IT apparatus is connected, based on the apparatus information acquiring port information stored in advance. Thus, even when IT apparatuses on a plurality of different sub-networks are connected to the optical switch, it is possible to acquire IP addresses of the IT apparatuses.

Figure 9:
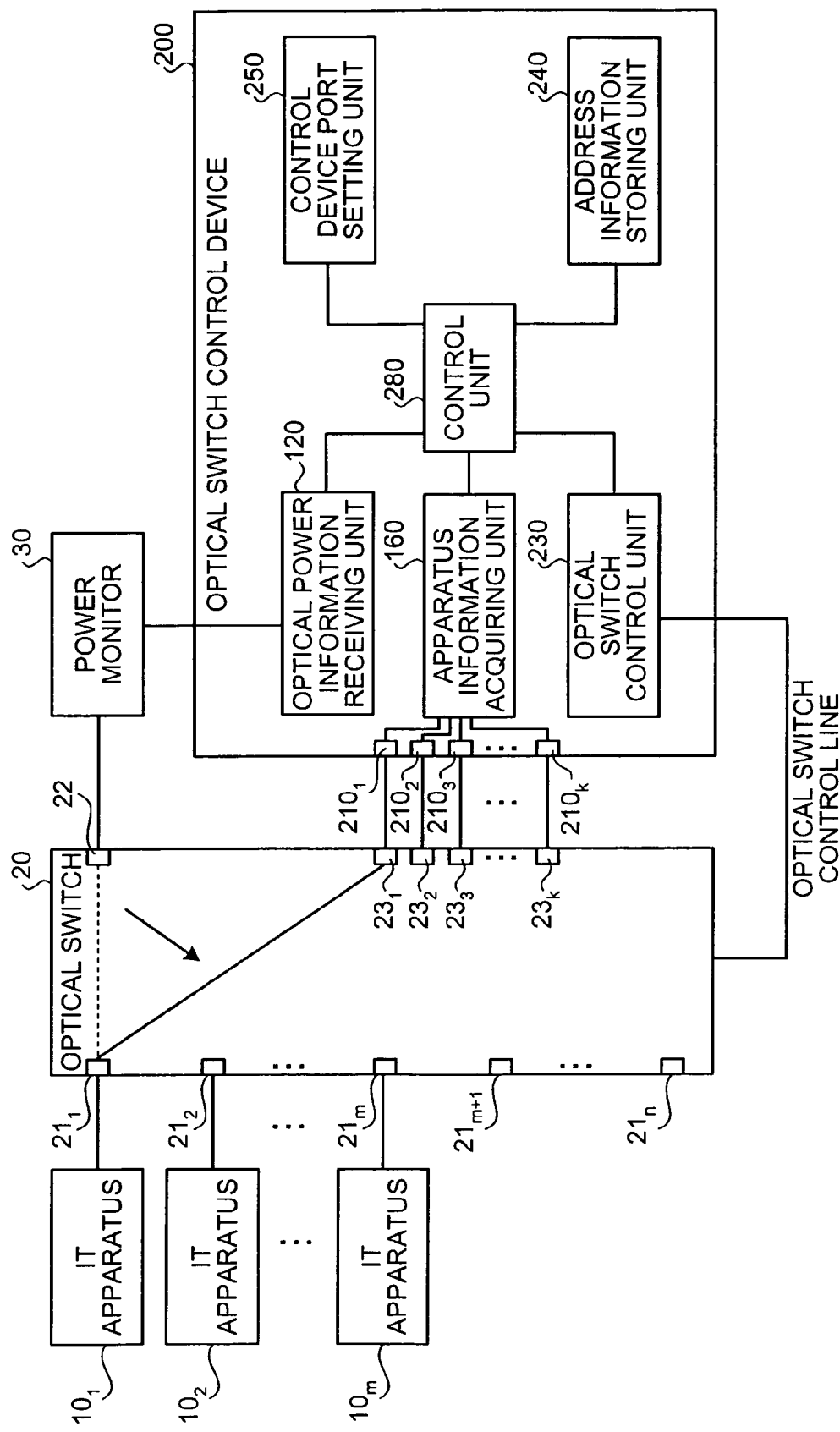
FIG. 9 is a block diagram of a constitution of an optical switch control device according to the second embodiment.

FIG. 9 is a block diagram of a constitution of the optical switch control device according to the second embodiment. For convenience of explanation, functional units playing the same roles as the units shown in FIG. 2 are denoted by the identical reference numerals and signs. Detailed explanations of the functional units are omitted.

As shown in FIG. 9, an optical switch control device 200 is connected to the optical switch 20 and the power monitor 30. The optical switch control device 200 is connected to the optical switch 20 via apparatus information acquiring ports $210_1$ to $210_k$ and is also connected to the optical switch 20 via an optical switch control line for controlling connection among respective ports of the optical switch 20.

The optical switch 20 includes control device connection ports $23_1$ to $23_k$. The control device connection ports $23_1$ to $23_k$ are connected to the apparatus information acquiring ports $210_1$ to $210_k$ of the optical switch control device 200, respectively.

The optical switch control device 200 is a device that controls the optical switch 20 to perform connection switching among IT apparatuses connected to the optical switch 20 to thereby change network topology. The optical switch control device 200 includes the optical power information receiving unit 120, an optical switch control unit 230, an address information storing unit 240, a control device port setting unit 250, the apparatus information acquiring unit 160, and a control unit 280.

The optical switch control unit 230 is a processing unit that controls the optical switch 20 to perform connection switching among IT apparatuses connected to the optical switch 20. For example, the optical switch control unit 230 controls the optical switch 20 to cyclically connect the power monitor port 22 to the apparatus connection ports $21_1$ to $21_n$ to thereby allow the power monitor 30 to sequentially detect optical power of the respective apparatus connection ports.

When the optical power information receiving unit 120 judges that a new IT apparatus is connected to any one of the apparatus connection ports of the optical switch 20, the optical switch control unit 230 controls the optical switch 20 to switch a connection destination of the apparatus connection port, to which the IT apparatus is connected, from the power monitor port 22 to a control device connection port corresponding to the apparatus connection port. The control device connection port to be the connection destination is a control device connection port connected to an apparatus information acquiring port indicated by a control device setting port acquired by a control device port setting unit 250 described later.

The optical switch control unit 230 changes the apparatus information acquiring ports $210_1$ to $210_k$ and the control device connection ports $23_1$ to $23_k$ according to the apparatus connection port to which the IT apparatus is connected. Thus, even when IT apparatuses on a plurality of different sub-networks are connected to the optical switch, it is possible to acquire IP addresses of the IT apparatuses.

The address information storing unit 240 is a storing unit that stores, for each of the apparatus connection ports $21_1$ to $21_n$ of the optical switch 20, information on an apparatus information acquiring port corresponding to the apparatus connection port. FIG. 10 is a table of an example of the address information storing unit 240 according to the second embodiment. As shown in the figure, the address information storing unit 240 stores an apparatus connection port number corresponding $21_1$ to $21_n$ of the optical switch 20, a connected apparatus name of an IT apparatus, a connected apparatus address indicating an IP address set in the IT apparatus, and a control device setting port indicating each of the apparatus information acquiring ports $210_1$ to $210_k$ corresponding to each of the apparatus connection ports $21_1$ to $21_n$. For example, a control device setting port "a" corresponds to the apparatus information acquiring port $210_1$ shown in FIG. 9.

The control device port setting unit 250 is a processing unit that selects a port used for communication with an IT apparatus from the apparatus information acquiring ports $210_1$ to $210_k$. Specifically, when the optical power receiving unit 120 judges that a new IT apparatus is connected to an apparatus connection port of the optical switch 20, the control port setting unit 150 acquires a control device setting port corresponding to the apparatus connection port from the address information storing unit 240 and notifies the optical switch control unit 230 of the control device setting port.

The control unit 280 is a processing unit that controls the entire optical switch control device 200. Specifically, the control unit 280 shifts control among functional units and exchanges data between a functional unit and a storing unit to thereby cause the optical switch control device 200 to function as one apparatus.

In the second embodiment, the address information storing unit 240 stores connected apparatus addresses and control device setting ports in association with the respective apparatus connection ports and communicates with IT apparatuses based on such port information. However, the address information storing unit 240 can also communicate with the IT apparatuses while sequentially using the apparatus information acquiring ports $210_1$ to $210_k$ based on a stored plurality of control device setting addresses without associating port information and apparatus connection ports.

FIG. 11 is a table of an example of the address information storing unit 240 at the time when an address is not set for each of apparatus connection ports according to the second embodiment. As shown in the figure, in this case, the address information storing unit 240 stores, for each of sub-networks of IT apparatuses that are likely to be connected to the optical switch, an apparatus information acquiring port corresponding to the sub-network.

As described above, in the second embodiment, the optical switch control unit 230 controls the optical switch 20 to connect the IT apparatus and the optical switch control device 200. The control device port setting unit 250 changes the apparatus information acquiring ports $210_1$ to $210_k$ based on the control device setting ports stored in the address information storing unit 240. Thus, even when IT apparatuses on a plurality of different sub-networks are connected to the optical switch 20, the optical switch control device 200 can automatically acquire or check apparatus information (IP addresses) from the respective IT apparatuses.

In the explanation of the first embodiment, an IP address of the apparatus information acquiring port 110 of the optical switch control device 100 is changed according to acquire IP addresses from IT apparatuses. In the explanation of the second embodiment, a port used for communication with an IT apparatus is changed from the apparatus information acquiring ports $210_1$ to $210_k$ provided in the optical switch control device 200 to acquire IP addresses from IT apparatuses.

However, when a plurality of sub-networks is connected in a large scale network, connection among different sub-networks may be realized by converting an IP address using a packet transfer device.

In an explanation of a third embodiment of the present invention, IP addresses of IT apparatuses connected to a plurality of different sub-networks are acquired by inserting a packet transfer device such as a layer 3 switch or a router between apparatus connection ports of an optical switch and an apparatus information acquiring port of an optical switch control device.

Figure 12:
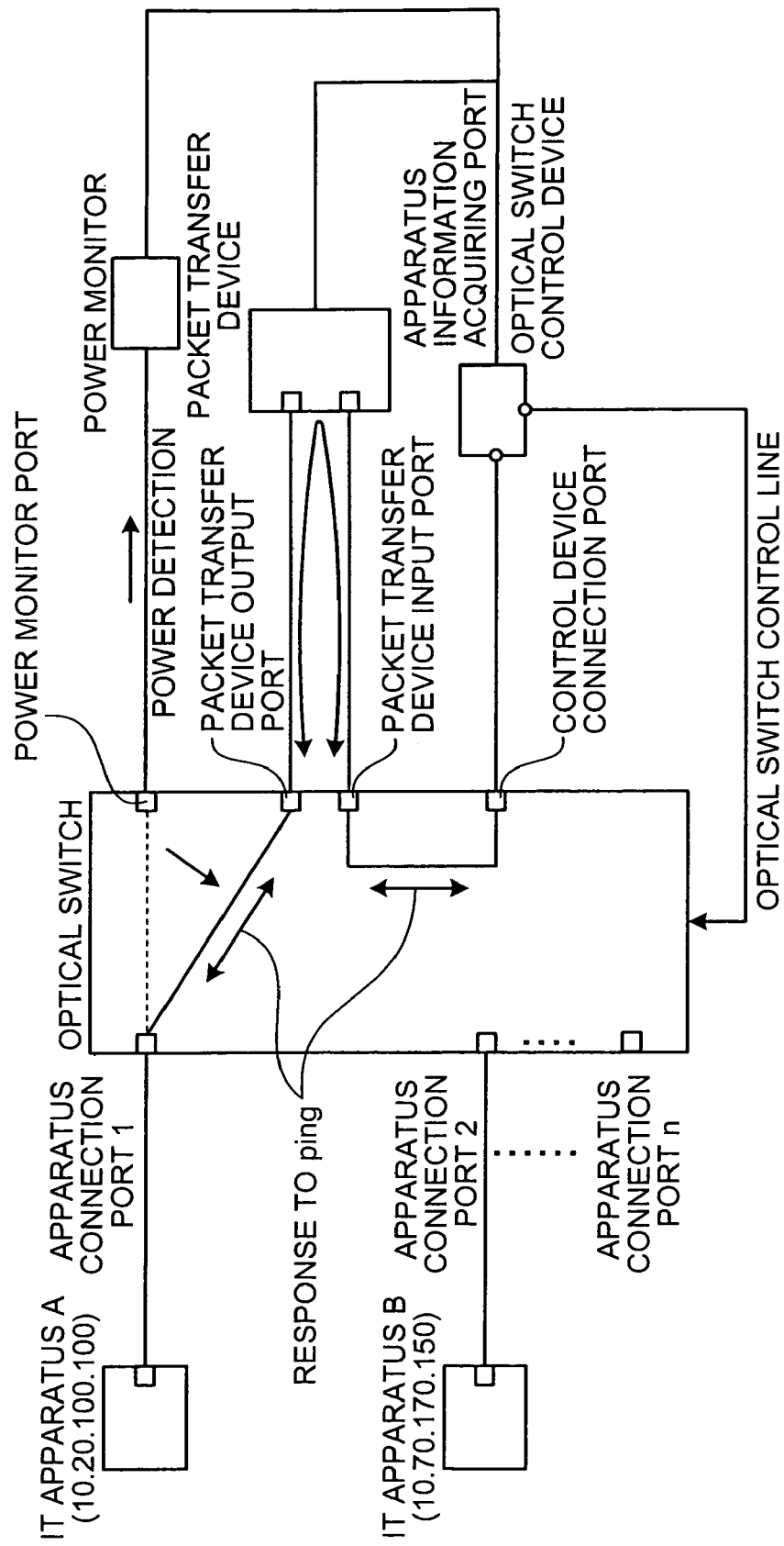
FIG. 12 is a diagram for explaining a connected apparatus address acquiring method according to a third embodiment of the present invention.

FIG. 12 is a diagram for explaining a connected apparatus address acquiring method by the optical switch control device according to the third embodiment.

As shown in the figure, the optical switch control device is connected to the packet transfer device via an optical switch. The packet transfer device is connected to a packet transfer device input port and a packet transfer device output port of the optical switch. The packet transfer device input port and a control device connection port are connected in the optical switch.

When it is judged that a new IT apparatus is connected to the apparatus connection port 1 of the optical switch, the optical switch control device controls the optical switch to switch a connection destination of the apparatus connection port 1 from a power monitor port to the packet transfer device output port. The optical switch control device converts an IP address via the packet transfer device to communicate with the IT apparatus A and acquire an IP address of the IT apparatus A.

In this way, the optical switch control device according to the third embodiment connects the IT apparatus connected and the optical switch control device via the packet transfer device and automatically converts an IP address of the apparatus information acquiring port. Thus, even when IT apparatuses on a plurality of different sub-networks are connected to the optical switch, it is possible to acquire IP addresses of the IT apparatuses.

Figure 13:
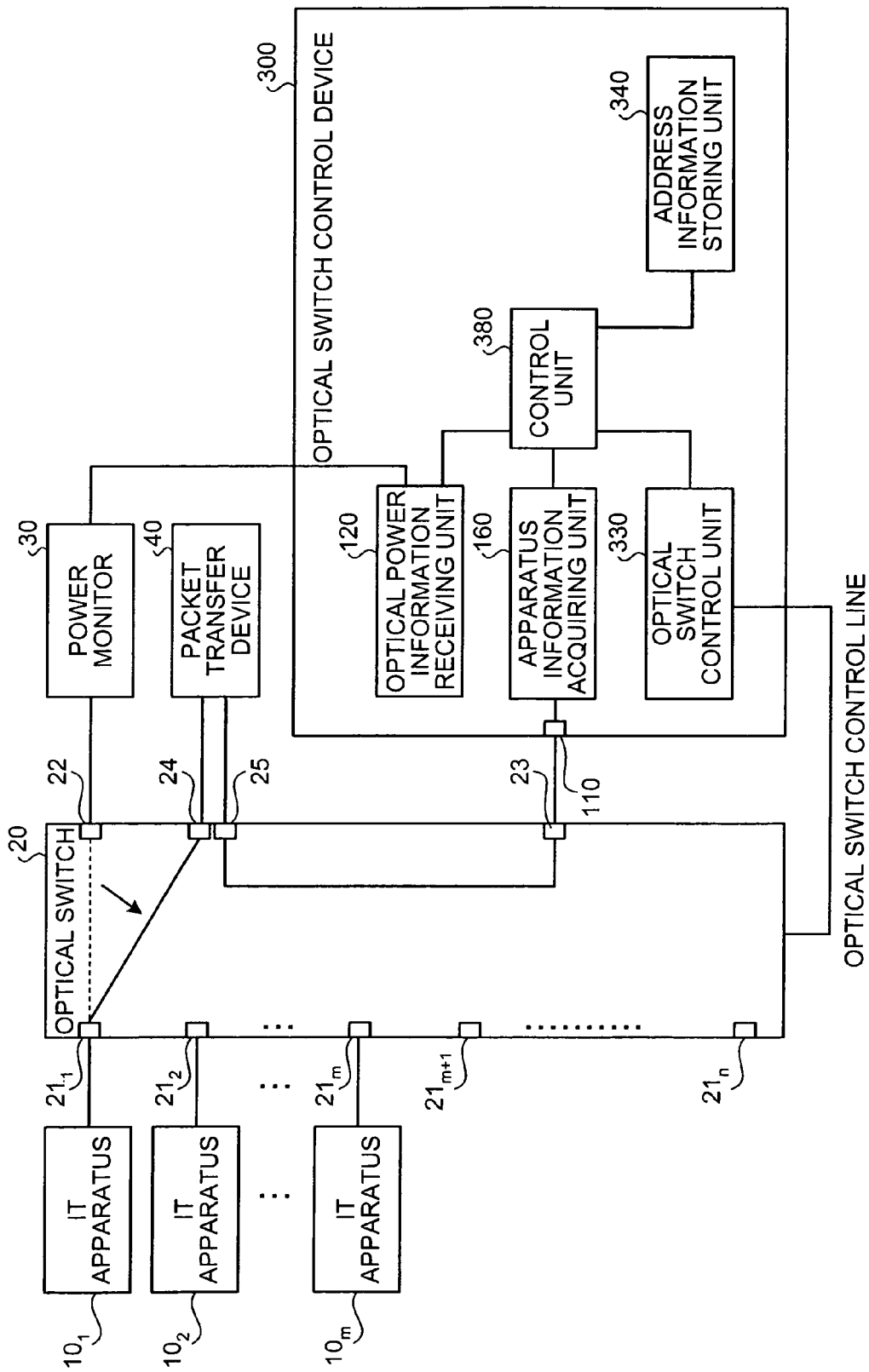
FIG. 13 is a block diagram of a constitution of an optical switch control device according to the third embodiment.

FIG. 13 is a block diagram of a constitution of the optical switch control device according to the third embodiment. For convenience of explanation, functional units playing the same roles as the units shown in FIG. 2 are denoted by the identical reference numerals and signs. Detailed explanations of the functional units are omitted.

As shown in FIG. 13, an optical switch control device 300 is connected to the optical switch 20 and the power monitor 30. The optical switch control device 300 is connected to the optical switch 20 via the apparatus information acquiring port 110 and is also connected to the optical switch 20 via an optical switch control line for controlling connection among respective ports of the optical switch 20. A packet transfer device 40 is connected to the optical switch 20.

The optical switch 20 includes a packet transfer device output port 24 and a packet transfer device input port 25. The packet transfer device output port 24 and the packet transfer device input port 25 are connected to the packet transfer device 40, respectively. The packet transfer device output port 25 is connected to the control device connection port 23 in the optical switch 20.

The optical switch control device 300 is a device that controls the optical switch 20 to perform connection switching among IT apparatuses connected to the optical switch 20 to thereby change network topology. The optical switch control device 300 includes the optical power information receiving unit 120, an optical switch control unit 330, an address information storing unit 340, the apparatus information acquiring unit 160, and a control unit 380.

The optical switch control unit 330 is a processing unit that controls the optical switch 20 to perform connection switching among IT apparatuses connected to the optical switch 20. For example, when the optical power information receiving unit 120 judges that a new IT apparatus is connected to any one of the apparatus connection ports of the optical switch 20, the optical switch control unit 330 controls the optical switch 20 to switch a connection destination of the apparatus connection port, to which the IT apparatus is connected, from a power monitor port to the packet transfer device output port 24.

The optical switch control unit 330 connects the IT apparatus connected to the optical switch 20 and the optical switch control device 300 via the packet transfer device 40 and automatically converts an IP address of the apparatus information acquiring port 110. Thus, even when IT apparatuses on a plurality of different sub-networks are connected to the optical switch 20, it is possible to acquire IP addresses of the IT apparatuses.

Figures 14, 15:
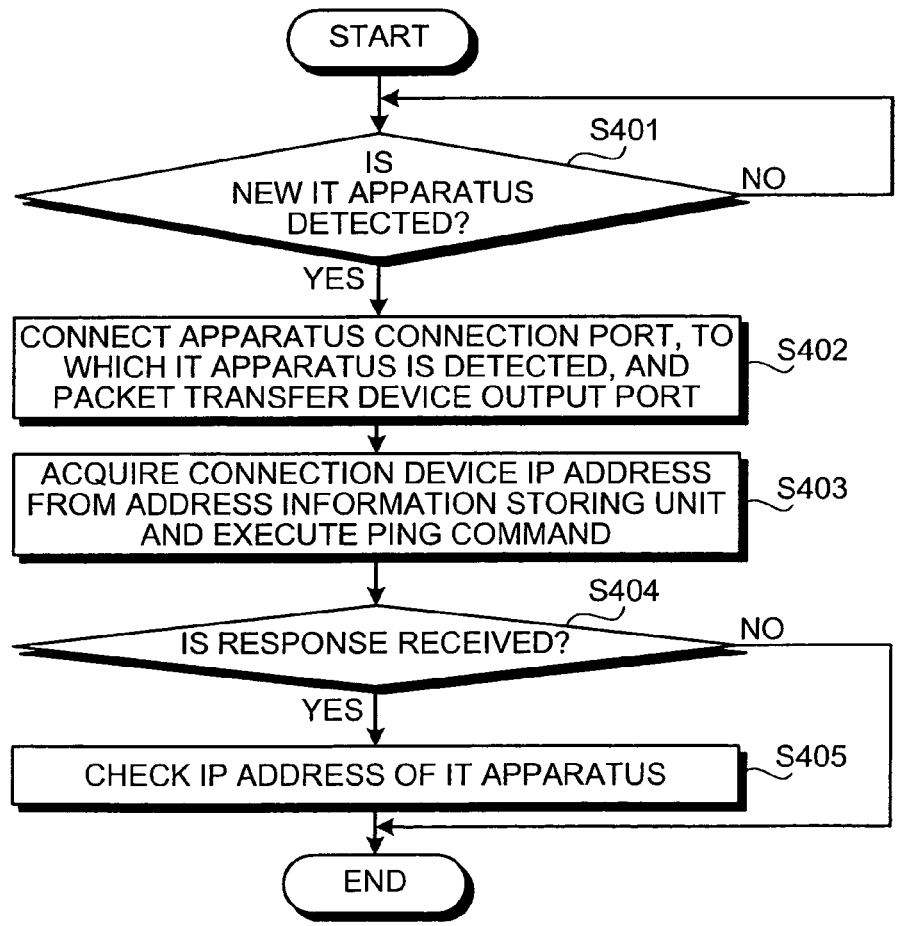
FIG. 14 is a table of an example of an address information storing unit according to the third embodiment.
FIG. 15 is a flowchart of a processing procedure of connected apparatus address acquiring processing by the optical switch control device according to the third embodiment.

The address information storing unit 340 is a storing unit that stores, for each of the apparatus connection ports of the optical switch 20, address information of a connected apparatus assumed to be connected to the port. FIG. 14 is a table of an example of the address information storing unit 340 according to the third embodiment. As shown in the figure, the address information storing unit 340 stores, for each of the apparatus connection ports, an apparatus connection port number, a connected apparatus name, and a connected apparatus address.

The control unit 380 is a processing unit that controls the entire optical switch control device 300. Specifically, the control unit 380 shifts control among functional units and exchanges data between a functional unit and a storing unit to thereby cause the optical switch control device 300 to function as one apparatus.

FIG. 15 is a flowchart of a processing procedure of connected apparatus address acquiring processing by the optical switch control device 300 according to the third embodiment.

As shown in the figure, in the optical switch control device 300, the optical switch control unit 330 controls the optical switch 20 to cyclically connect the power monitor port 22 to the apparatus connection ports $21_1$ to $21_n$. The optical power information receiving unit 120 receives optical power information transmitted from the power monitor 30. When the optical power information receiving unit 120 judges that a new IT apparatus is connected ("Yes" at step S401), the optical switch control unit 330 controls the optical switch 20 to connect an apparatus connection port, to which the IT apparatus is connected, and the packet transfer device output port 24 (step S402).

The apparatus information acquiring unit 160 acquires a connected apparatus address corresponding to the apparatus connection port, to which the IT apparatus is connected, from the address information storing unit 340 and executes a ping command on the connected apparatus address acquired (step S403).

When a response to the ping command is received ("Yes" at step S404), the apparatus information acquiring unit 160 checks an IP address of the IT apparatus based on a result of the response (step S405).

Thereafter, the optical switch control unit 330 controls the optical switch 20 to return a connection destination of the apparatus connection port, to which the IT apparatus is connected, from the packet transfer device output port 24 to the power monitor port 22 and resumes the cyclical connection of the power monitor port 22 and the apparatus connection ports 21₁, to 21ₙ. Consequently, the processing at step S401 and the subsequent steps is repeated.

In the third embodiment, the address information storing unit 340 stores connected apparatus addresses in association with the respective apparatus connection ports and designates such connected apparatus addresses to communicate with IT apparatuses. However, the address information storing unit 340 can also communicate with the IT apparatuses while sequentially designating a stored plurality of connected apparatus addresses without associating address information and apparatus connection ports.

FIG. 16 is a table of an example of the address information storing unit 340 at the time when an address is not set for each of the apparatus connection ports according to the third embodiment. As shown in the figure, in this case, the address information storing unit 340 stores, for each apparatus likely to be connected to the optical switch, an IP address of the apparatus.

Figure 17:
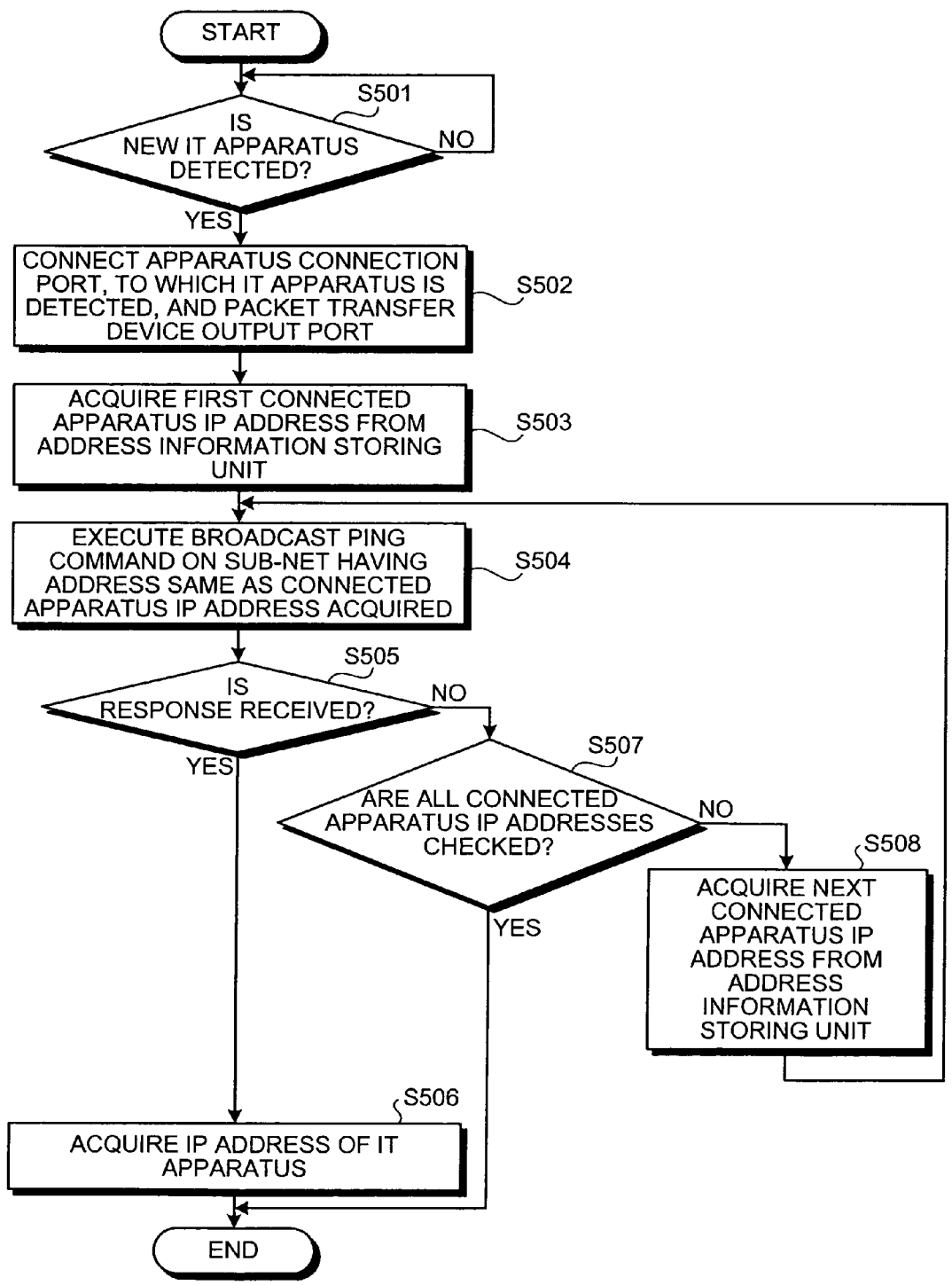
FIG. 17 is a flowchart of a processing procedure of the connected apparatus address acquiring processing at the time when an address is not set for each apparatus connection port.

FIG. 17 is a flowchart of a processing procedure of connected apparatus address acquiring processing at the time when an address is not set for each of the apparatus connection ports.

As shown in the figure, first, the optical switch control unit 330 controls the optical switch 20 to cyclically connect the power monitor port 22 to the apparatus connection ports 21₁, to 21ₙ. The power information receiving unit 120 receives optical power information transmitted from the power monitor 30. When the optical power information receiving unit 120 judges that a new IT apparatus is connected ("Yes" at step S510), the optical switch control unit 330 controls the optical switch 20 to connect an apparatus connection port, to which the IT apparatus is connected, and the packet transfer device output port 24 (step S502).

The apparatus information acquiring unit 160 acquires a first address from the connected apparatus addresses stored in the address information storing unit 140 (step S503) and designates a broadcast address of a sub-network same as the address to execute a broadcast ping command (step S504).

When a response to the broadcast ping command is received ("Yes" at step S505), the apparatus information acquiring unit 160 acquires an IP address of the IT apparatus based on a result of the response (step S506). On the other hand, when there is no response ("No" at step S505), the apparatus information acquiring unit 160 sequentially acquires the connected apparatus addresses from the address information storing unit 140 and repeats execution of the broadcast ping command ("No" at step S507, step S508).

When a response from an IT apparatus is received or when all the apparatus connection ports are checked to find no response, the optical switch control unit 330 returns a connection destination of the apparatus connection port, to which the IT apparatus is connected, from the packet transfer device output port 24 to the power monitor port 22 and resumes the cyclical connection of the power monitor port 22 and the apparatus connection ports 21₁, to 21ₙ. Consequently, the processing at step S501 and the subsequent steps is repeated.

As described above, in the third embodiment, the optical switch control unit 330 controls the optical switch 20 to connect the IT apparatus and the optical switch control device 300 via the packet transfer device 40. Thus, even when IT apparatuses on a plurality of different networks are connected to the optical switch 20, the optical switch control device 300 can automatically acquire or check apparatus information (IP addresses) from the respective IT apparatuses.

In the explanation of the third embodiment, the packet transfer device such as a layer 3 switch or a router is used. However, the present invention is not limited to this. It is possible to apply the present invention when a device having a function of converting an address (an address converter) other than the packet transfer device is used.

In the explanations of the first to the third embodiments, the optical switch control device executes a ping command to acquire IP addresses from IT apparatuses. However, IT apparatuses connected to an optical switch may include power monitors and voluntarily transmit information at the opportunity of detecting optical power from the optical switch control device.

In an explanation of a fourth aspect of the present invention, power monitors are added to IT apparatuses connected to an optical switch and the respective IT apparatuses voluntarily transmits a Simple Network Management Protocol (SNMP) signal, whereby an optical switch control device acquires IP addresses from IT apparatuses connected to a plurality of different sub-networks.

Figure 18:
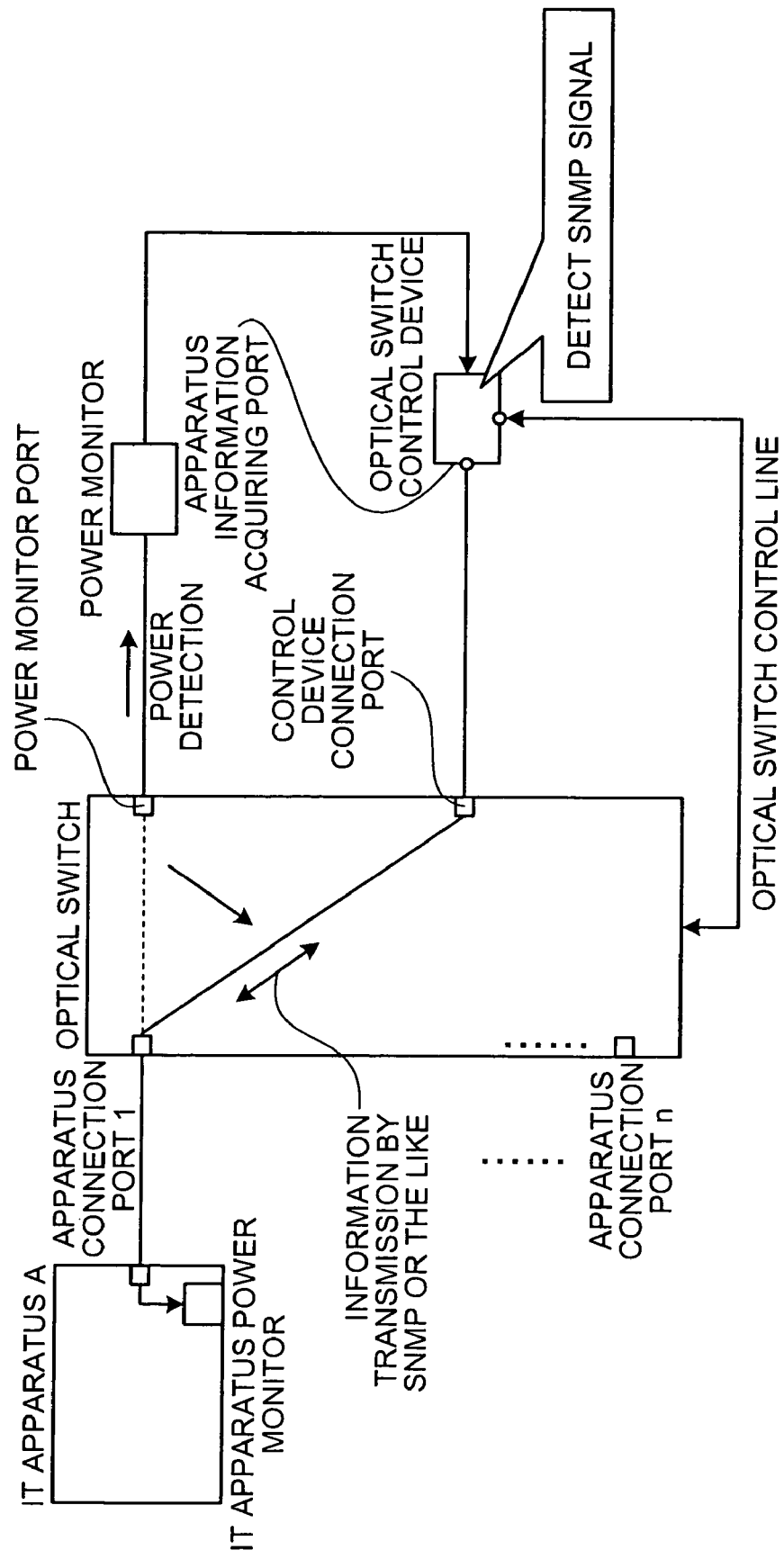
FIG. 18 is a diagram for explaining a connected apparatus address acquiring method according to a fourth embodiment of the present invention.

FIG. 18 is a diagram for explaining a connected apparatus address acquiring method by the optical switch control device according to the fourth embodiment.

As shown in the figure, power monitors are provided in IT apparatuses connected to an optical switch. When each of the IT apparatuses detects optical power from the optical switch control device, the IT apparatus transmits an SNMP signal with the detection as an opportunity. A function of detecting an SNMP signal transmitted to a network is added to the optical switch control device.

When it is judged that a new IT apparatus A is connected to the apparatus connection port 1 of the optical switch, the optical switch control device controls the optical switch to switch a connection destination of the apparatus connection port 1 from a power monitor port to a control device connection port. The IT apparatus A connected detects optical power from the optical switch control device and transmits an SNMP signal with the detection as an opportunity. The optical switch control device detects the SNMP signal transmitted by the IT apparatus A and acquires an IP address of the IT apparatus A from the SNMP signal.

In this way, the optical switch control device according to the fourth embodiment detects an SNMP signal transmitted by the IT apparatus including the power monitor at the opportunity of detecting optical power of the optical switch control device and acquires an IP address of the IT apparatus from the SNMP signal detected. Thus, even when IT apparatuses on a plurality of different sub-networks are connected to the optical switch, it is possible to acquire IP addresses of the IT apparatuses.

FIG. 19 is a block diagram of a constitution of the optical switch control device according to the fourth embodiment. For convenience of explanation, functional units playing the same roles as the units shown in FIG. 2 are denoted by the identical reference numerals and signs. Detailed explanations of the functional units are omitted.

As shown in FIG. 19, IT apparatus power monitors $51_1$ to $51_m$ are provided in IT apparatuses $50_1$ to $50_m$ connected to the optical switch 20, respectively. The IT apparatus power monitors $51_1$ to $51_m$ detect optical power from the apparatus connection ports $21_1$ to $21_m$ of the optical switch 20. When the IT apparatus power monitors $51_1$ to $51_m$ detect the optical power, the IT apparatuses $50_1$ to $50_m$ transmit SNMP signals with the detection as an opportunity.

The optical switch control device 400 is a device that controls the optical switch 20 to perform connection switching among IT apparatuses connected to the optical switch 20 to thereby change network topology. The optical switch control device 400 includes the optical power information receiving unit 120, the optical switch control unit 130, an apparatus information acquiring unit 460, and a control unit 480.

The apparatus information acquiring unit 460 is a processing unit that acquires an IP address from an IT apparatus connected to the optical switch 20. Specifically, the apparatus information acquiring unit 160 detects an SNMP signal transmitted by the IT apparatus and acquires an IP address from the SNMP signal detected.

The apparatus information acquiring unit 460 detects SNMP signals transmitted by the IT apparatuses $50_1$ to $50_m$ including the power monitor $51_1$ to $51_m$ and acquires IP addresses of the IT apparatuses from the SNMP signals detected. Thus, even when IT apparatuses on a plurality of different sub-networks are connected to the optical switch 20, it is possible to acquire IP addresses of the IT apparatuses.

The control unit 480 is a processing unit that controls the entire optical switch control device 400. Specifically, the control unit 480 shifts control among functional units and exchanges data between a functional unit and a storing unit to thereby cause the optical switch control device 400 to function as one apparatus.

FIG. 20 is a flowchart of a processing procedure of connected apparatus address acquiring processing by the optical switch control device 400 according to the fourth embodiment.

As shown in the figure, in the optical switch control device 400, the optical switch control unit 130 controls the optical switch 20 to cyclically connect the power monitor port 22 to the apparatus connection ports $21_1$ to $21_m$. The optical power information receiving unit 120 receives optical power information transmitted from the power monitor 30. When the optical power information receiving unit 120 judges that a new IT apparatus is connected ("Yes" at step S601), the optical switch control unit 130 controls the optical switch 20 to connect an apparatus connection port, to which the IT apparatus is connected, and the control device connection port 23 (step S602).

The apparatus information acquiring unit 460 detects an SNMP signal transmitted by the IT apparatus at the opportunity of detecting optical power of the optical switch control device 400 (step S603). The apparatus information acquiring unit 460 acquires an IP address of the IT apparatus from the SNMP signal detected (step S604).

The optical switch control unit 130 returns a connection destination of the apparatus connection port, to which the IT apparatus is connected, from the control device connection port 23 to the power monitor port 22 and resumes the cyclical connection of the power monitor port 22 and the apparatus connection ports $21_1$ to $21_m$. Consequently, the processing at step S601 and the subsequent steps is repeated.

As described above, in the fourth embodiment, the apparatus information acquiring unit 460 detects an SNMP signal transmitted by the IT apparatus at the opportunity of detecting optical power of the optical switch control device 400 and acquires an IP address of the IT apparatus. Thus, even when IT apparatuses on a plurality of different networks are connected to the optical switch 20, the optical switch control device 400 can automatically acquire apparatus information (IP addresses) from the respective IT apparatuses.

In the explanations of the first to the fourth embodiments, IP addresses are set in advance in IT apparatuses connected to the optical switch. However, depending on a network system, IP addresses may be automatically allocated to IT apparatuses connected to a network using an addressing apparatus such as a Dynamic Host Configuration Protocol (DHCP) server.

In an explanation of a fifth embodiment of the present invention, IP addresses of IT apparatuses connected to an optical switch are automatically allocated by an addressing apparatus. In the fifth embodiment, a DHCP server is used as the addressing apparatus.

Figure 21A:
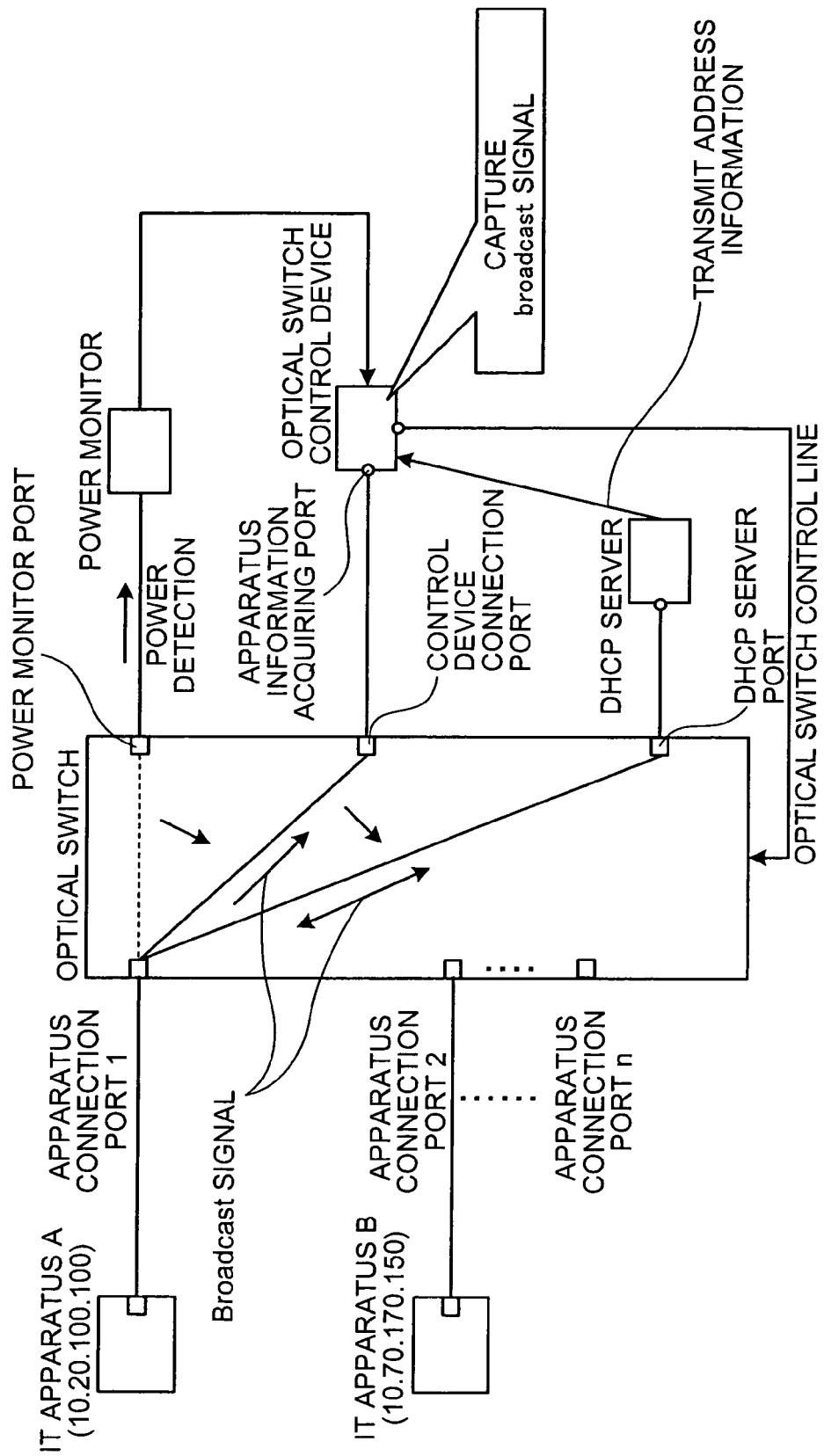
FIG. 21A is a diagram for explaining a connected apparatus address acquiring method according to a fifth embodiment of the present invention.

FIG. 21A is a diagram for explaining a connected apparatus address acquiring method by an optical switch control device according to the fifth embodiment.

As shown in the figure, a DHCP server is connected to an optical switch. When an IT apparatus is connected via the optical switch, the DHCP server automatically allocates an IP address to the IT apparatus. The DHCP server is also connected to the optical switch control device.

When it is judged that a new IT apparatus is connected to the apparatus connection port 1 of the optical switch, the optical switch control device controls the optical switch to switch a connection destination of the apparatus connection port 1 from a power monitor port to a control device connection port. The optical switch control device detects a DHCP server search signal transmitted by the IT apparatus and acquires a physical address (a MAC address) of the IT apparatus from the signal.

After acquiring the physical address, the optical switch apparatus controls the optical switch to switch a connection destination of the apparatus connection port 1 from the control device connection port to a DHCP server port corresponding to the physical address. The DHCP server allocates an IP address to the IT apparatus A. The optical switch control device acquires the IP address allocated to the IT apparatus A from the DHCP server.

Figure 21B:
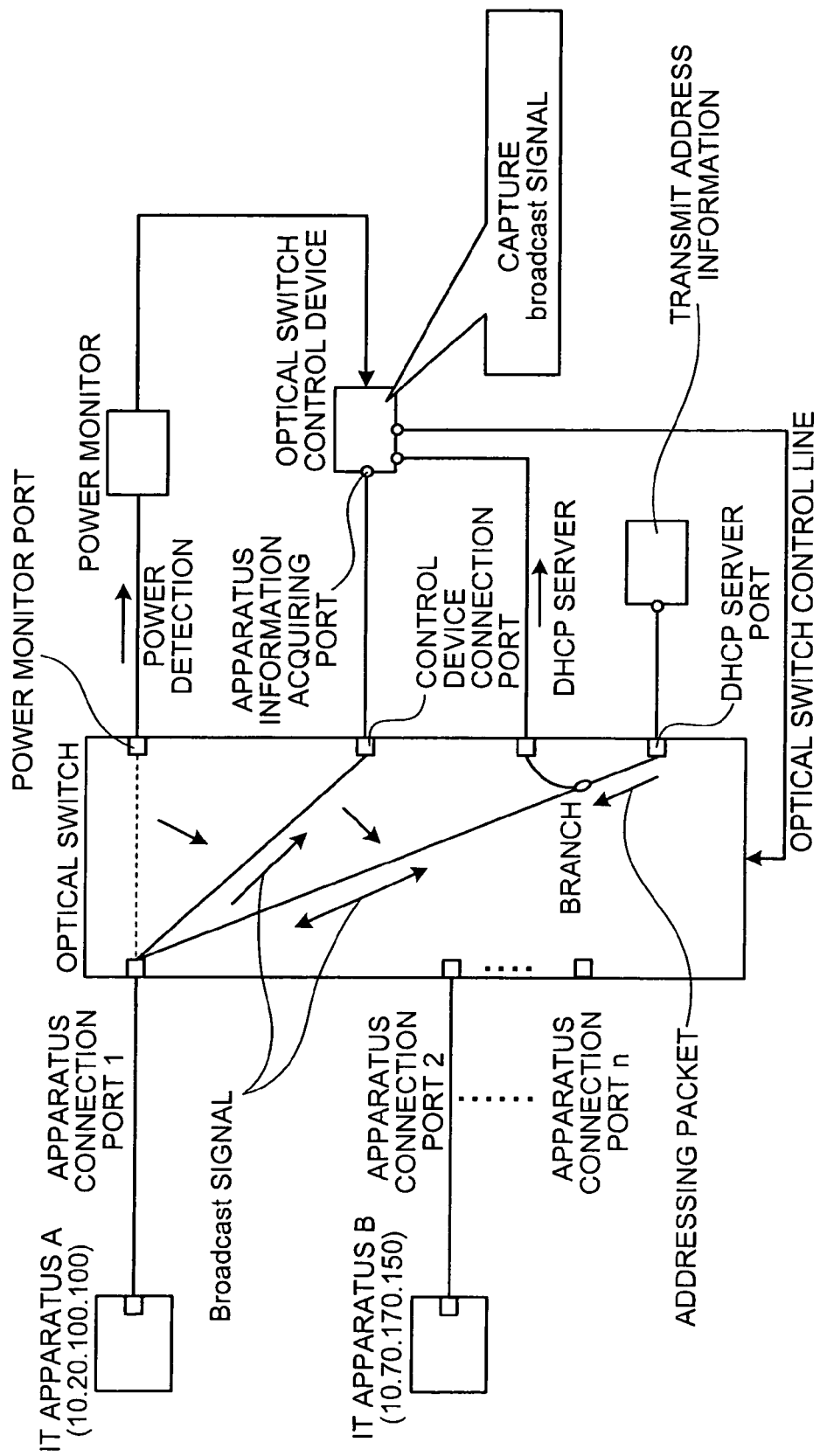
FIG. 21B is a diagram for explaining the connected apparatus address acquiring method according to the fifth embodiment.

In the example in FIG. 21A, the optical switch control device acquires an IP address by referring to the DHCP server. However, when the DHCP server allocates an IP address to an IT apparatus, the DHCP server may simultaneously transmit information of the IP address to the optical switch control device. FIG. 21B is a diagram for explaining the connected apparatus address acquiring method by the optical switch control device according to the fifth embodiment. As shown in the figure, in this case, an optical switch control device and a DHCP server are connected via an optical switch and, when the DHCP server allocates an IP address (transmits an addressing packet) to an IT apparatus, the DHCP server simultaneously transmits information of the IP address to the optical switch control device.

The optical switch control device according to the fifth embodiment controls the optical switch, connects an IT apparatus and a DHCP server corresponding to the IT apparatus, and, after the DHCP server allocates an IP address to the IT apparatus, acquires the IP address of the IT apparatus with reference to the DHCP server. Thus, even when IT apparatuses on a plurality of different sub-networks are connected to the optical switch, it is possible to acquire IP addresses of the IT apparatuses.

Figure 22:
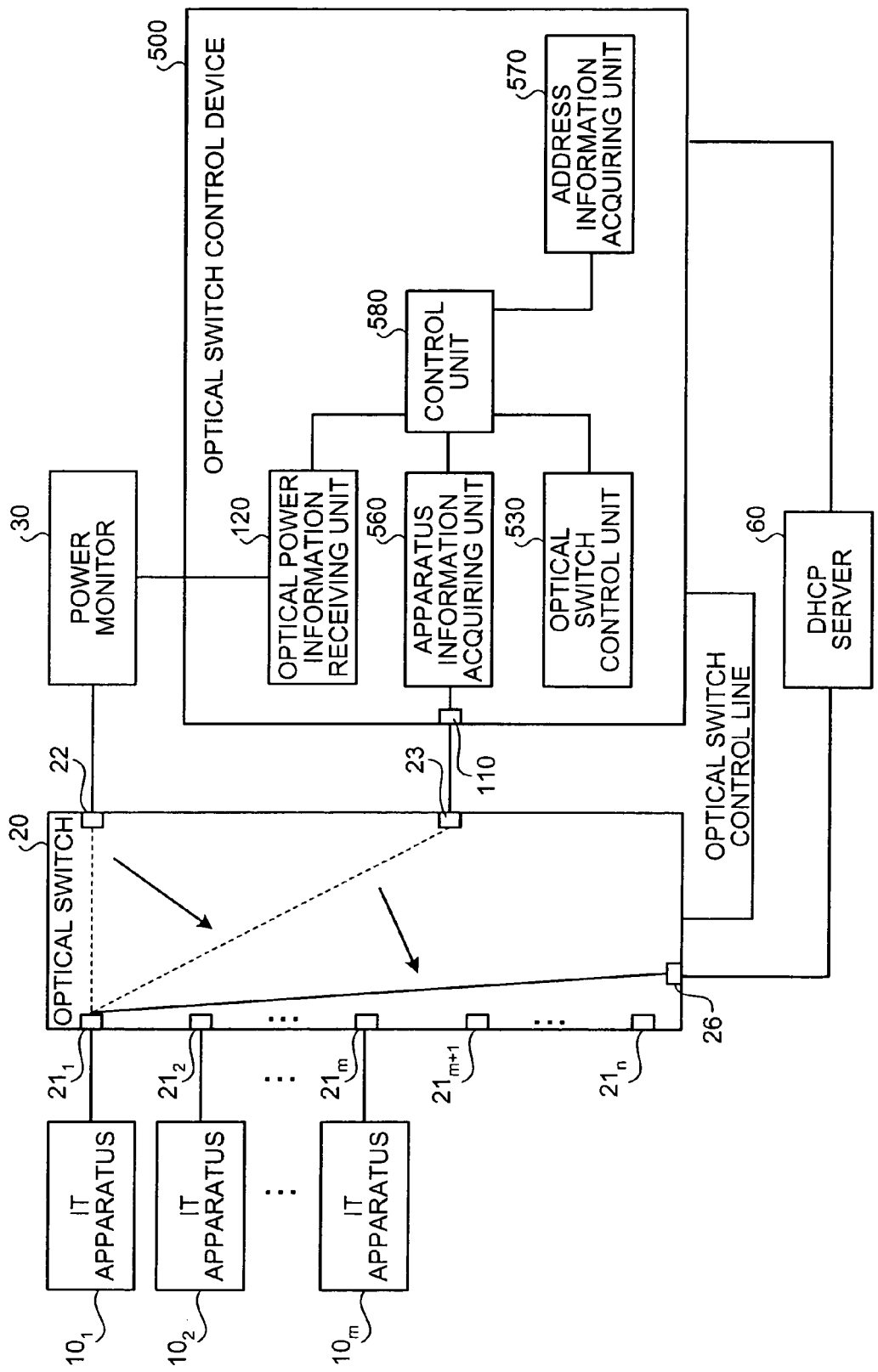
FIG. 22 is a block diagram of a constitution of an optical switch control device according to the fifth embodiment.

FIG. 22 is a block diagram of a constitution of the optical switch control device according to the fifth embodiment. For convenience of explanation, functional units playing the same roles as the units shown in FIG. 2 are denoted by the identical reference numerals and signs. Detailed explanations of the functional units are omitted.

As shown in FIG. 22, the optical switch 20 includes a DHCP server port 26 and is connected to a DHCP server 60 at the DHCP server port 26. The DHCP server 60 is also connected to an optical switch control device 500.

The DHCP server 60 is a device that automatically allocates IP addresses to IT apparatuses connected to a network. When the DHCP server is connected to an IT apparatus via the optical switch 20, the DHCP server automatically allocates an IP address to the IT apparatus. In FIG. 22, for convenience of explanation, only one DHCP server is shown. However, a plurality of DHCP servers are connected to the optical switch control device 500 according to IT apparatuses connected to the optical switch 20.

The optical switch control device 500 is a device that controls the optical switch 20 to perform connection switching among IT apparatuses connected to the optical switch 20 to thereby change network topology. The optical switch control device 500 includes the optical power information receiving unit 120, an optical switch control unit 530, an apparatus information acquiring unit 560, an address information acquiring unit 570, and a control unit 580.

The optical switch control unit 530 is a processing unit that controls the optical switch 20 to perform connection switching among IT apparatuses connected to the optical switch 20. For example, when the optical power information receiving unit 120 judges that a new IT apparatus is connected to any one of the apparatus connection ports of the optical switch 20, the optical switch control unit 530 controls the optical switch 20 to switch a connection destination of the apparatus connection port, to which the IT apparatus is connected, from the power monitor port 22 to the control device connection port 23.

The optical switch control unit 530 stores association of physical addresses of the IT apparatuses $10_1$ to $10_m$ connected to the optical switch 20 and the DHCP servers 60 in advance. When the apparatus information acquiring unit 560 described later detects a physical address of any one of the IT apparatuses, the optical switch control unit 530 decides the DHCP server 60 corresponding to the physical address. The optical switch control unit 530 switches a connection destination of the apparatus connection port, to which the IT apparatus is connected, from the control device connection port 23 to the DHCP server port 26 to which the DHCP server 60 corresponding to the physical address is connected.

The apparatus information acquiring unit 560 is a processing unit that detects a DHCP search signal transmitted by an IT apparatus and acquires a physical address of the IT apparatus. Specifically, the apparatus information acquiring unit 560 detects a DHCP server search signal transmitted by an IT apparatus when the IT apparatus is connected to the optical switch 20. The apparatus information acquiring unit 560 acquires a physical address of the IT apparatus from the DHCP server search signal detected.

The address information acquiring unit 570 is a processing unit that acquires an IP address allocated to an IT apparatus from the DHCP server 60. Specifically, when an IT apparatus is connected to the optical switch 20, the address information acquiring unit 570 acquires an IP address allocated to the IT apparatus with reference to the DHCP server 60.

The control unit 580 is a processing unit that controls the entire optical switch control device 500. Specifically, the control unit 580 shifts control among functional units and exchanges data between a functional unit and a storing unit to thereby cause the optical switch control device 500 to function as one apparatus.

Figure 23:
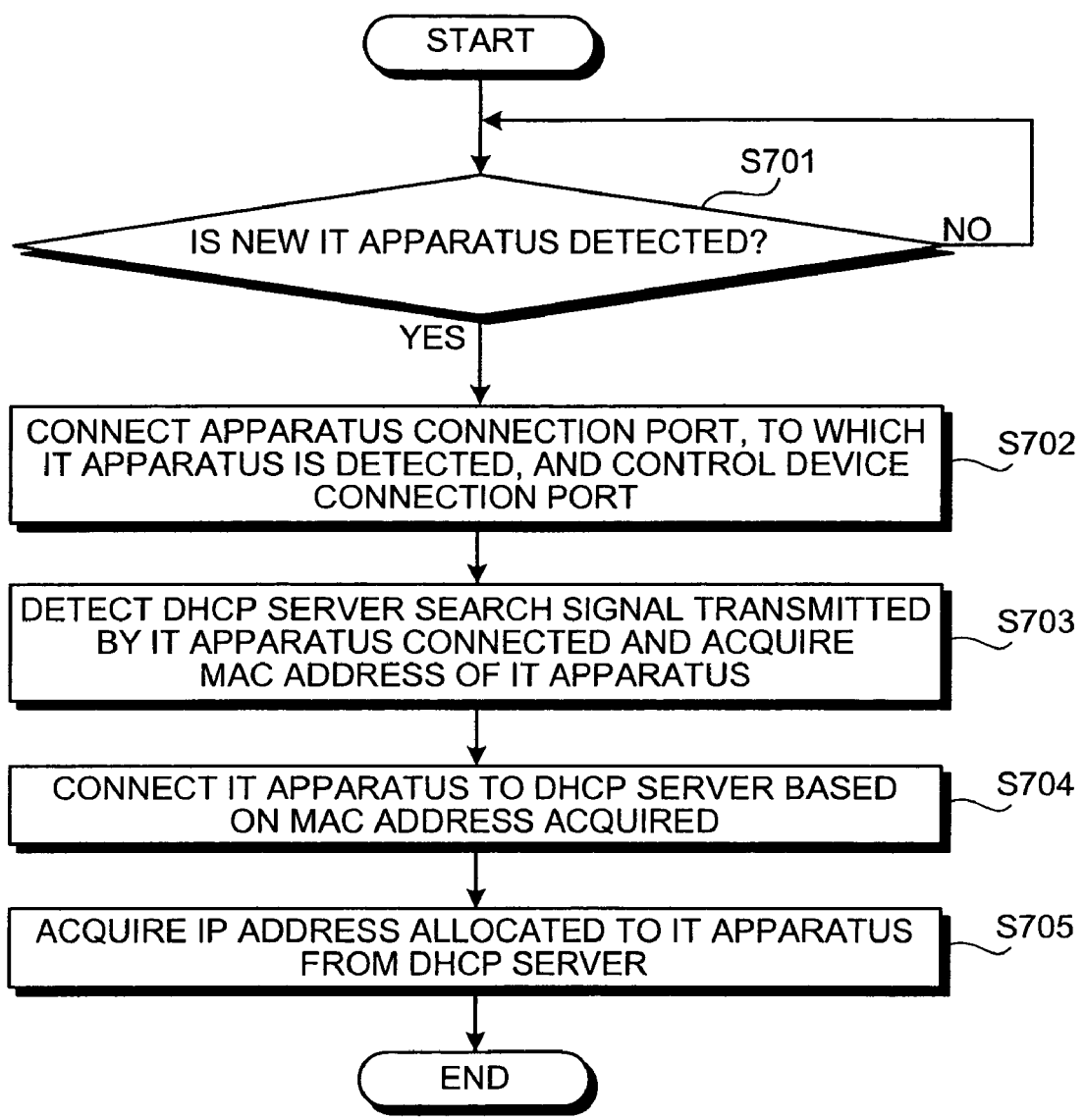
FIG. 23 is a flowchart of a processing procedure of connected apparatus address acquiring processing by the optical switch control device according to the fifth embodiment.

FIG. 23 is a flowchart of a processing procedure of connected apparatus address acquiring processing by the optical switch control device 500 according to the fifth embodiment.

As shown in the figure, in the optical switch control device 500, the optical switch control unit 130 controls the optical switch 20 to cyclically connect the power monitor port 22 to the apparatus connection ports $21_1$ to $21_n$. The optical power information receiving unit 120 receives optical power information transmitted from the power monitor 30. When the optical power information receiving unit 120 judges that a new IT apparatus is connected ("Yes" at step S701), the optical switch control unit 530 controls the optical switch 20 to connect an apparatus connection port, to which the IT apparatus is connected, and the control device connection port 23 (step S702).

The apparatus information acquiring unit 560 detects a DHCP server search signal transmitted by the IT apparatus at timing when the IT apparatus is connected to the optical switch 20 and acquires a physical address of the IT apparatus (step S703).

The optical switch control unit 530 controls the optical switch 20 to connect the apparatus connection port, to which the IT apparatus is connected, and a DHCP server port corresponding to the physical address of the IT apparatus (step S704). The DHCP server allocates an IP address to the IT apparatus.

The address information acquiring unit 570 acquires the IP address allocated to the IT apparatus from the DHCP server (step S705).

The optical switch control unit 530 returns a connection destination of the apparatus connection port, to which the IT apparatus is connected, from the control-device connection port 23 to the power monitor port 22 and resumes the cyclical connection of the power monitor port 22 and the apparatus connection ports $21_1$ to $21_n$. Consequently, the processing at step S701 and the subsequent steps is repeated.

In this way, the apparatus information acquiring unit 560 detects a DHCP server search signal transmitted by an IT apparatus connected to the optical switch 20 to connect the IT apparatus and the DHCP server 60. The address information acquiring unit 570 refers to the DHCP server 60. Thus, the optical switch control device 100 can acquire IP addresses allocated to IT apparatuses belonging to a plurality of different networks.

As described above, in the fifth embodiment, the optical power information receiving unit 120 receives optical power information transmitted from the power monitor 30. When the optical power information receiving unit 120 judges that a new IT apparatus is connected to the optical switch 20, the optical switch control unit 530 controls the optical switch 20 to connect the IT apparatus and the optical switch control device 500. The apparatus information acquiring unit 560 detects a physical address of the IT apparatus from a DHCP server search signal transmitted by the IT apparatus. The optical switch control unit 530 further controls the optical switch 20 to connect the IT apparatus and a DHCP server. The address information acquiring unit 570 acquires an IP address allocated to the IT apparatus with reference to the DHCP server. Thus, even when IT apparatuses on a plurality of different networks are connected to the optical switch 20, the optical switch control device 500 can automatically acquire apparatus information (IP addresses) from the respective IT apparatus.

In the first to the fifth embodiments, the connected apparatus address acquiring method by the optical switch control device is explained. However, the optical switch control device can also control connection among IT apparatuses in an optical switch by storing an acquired address of a connected apparatus for each of the connected apparatus ports.

Figure 24:
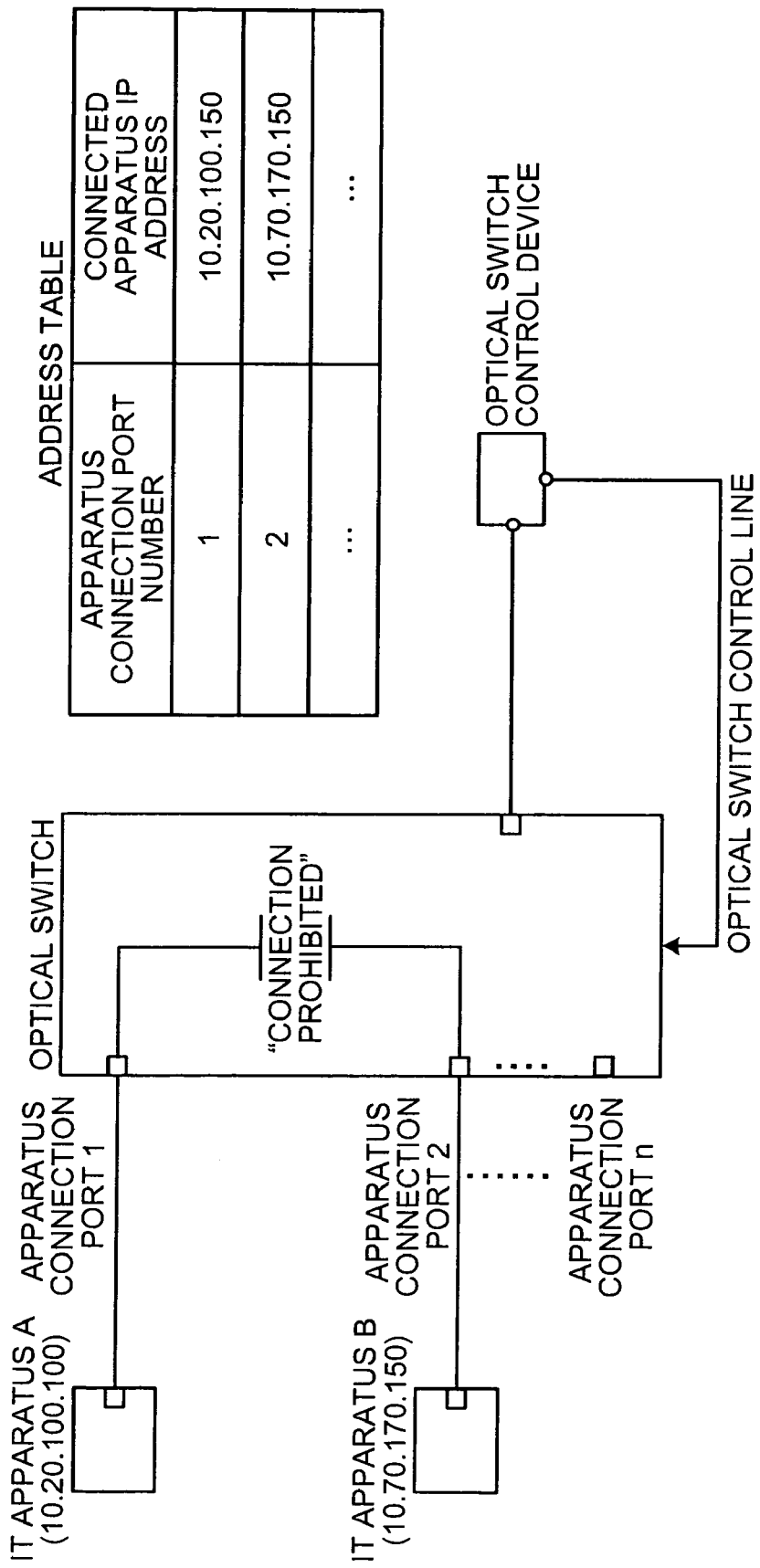
FIG. 24 is a diagram for explaining a method of prohibiting connection among different networks using an address table.

FIG. 24 is a diagram for explaining a method of prohibiting connection among different networks using an address table. As shown in the figure, the optical switch control device monitors a request for connecting IT apparatuses transmitted to the optical switch. When such a connection request is detected, the optical switch control device judges whether IP addresses of the respective IT apparatuses are connectable with reference to the address table. When the IP addresses are not connectable, it is possible to take measures for, for example, communicating an error message to a transmission source of an instruction.

Figure 25:
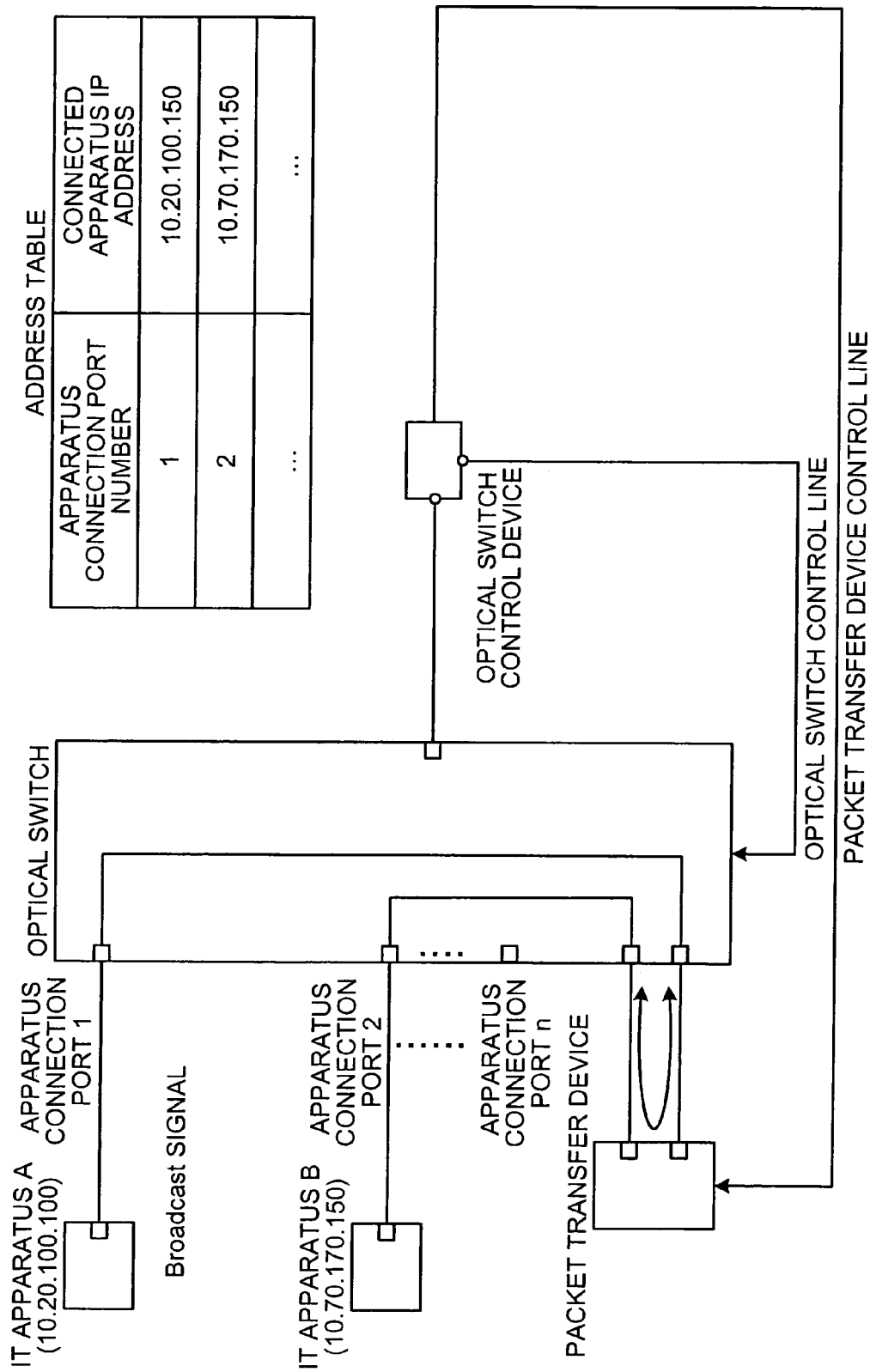
FIG. 25 is a diagram for explaining a method of connecting different networks to each other with a packet transfer device using an address table.

FIG. 25 is a diagram for explaining a method of connecting different networks using an address table by a packet transfer device. As shown in the figure, the optical switch control device monitors a request for connecting IT apparatuses transmitted to the optical switch. When such a connection request is detected, the optical switch control device refers to the address table. When IP addresses of the respective IT apparatuses are addresses of different networks, the optical switch control device controls the optical switch to connect ports, to which the IT apparatuses requested to be connected are connected, to ports to which the packet transfer device such as a router is connected. Consequently, the optical switch control device can connect the IT apparatuses.

In the explanations of the first to the fifth embodiments, the optical switch is used for the physical wiring switching device. However, the present invention is not limited to this. It is also possible to apply the present invention when a switch other than the optical switch such as an electric switch is used.

In the first to the fifth embodiments, the optical switch control device is explained. However, it is possible to obtain an optical switch control program having the same function as the optical switch control device by realizing the constitution of the optical switch control device with software. Thus, a computer that executes the optical switch control program is explained.

Figure 26:
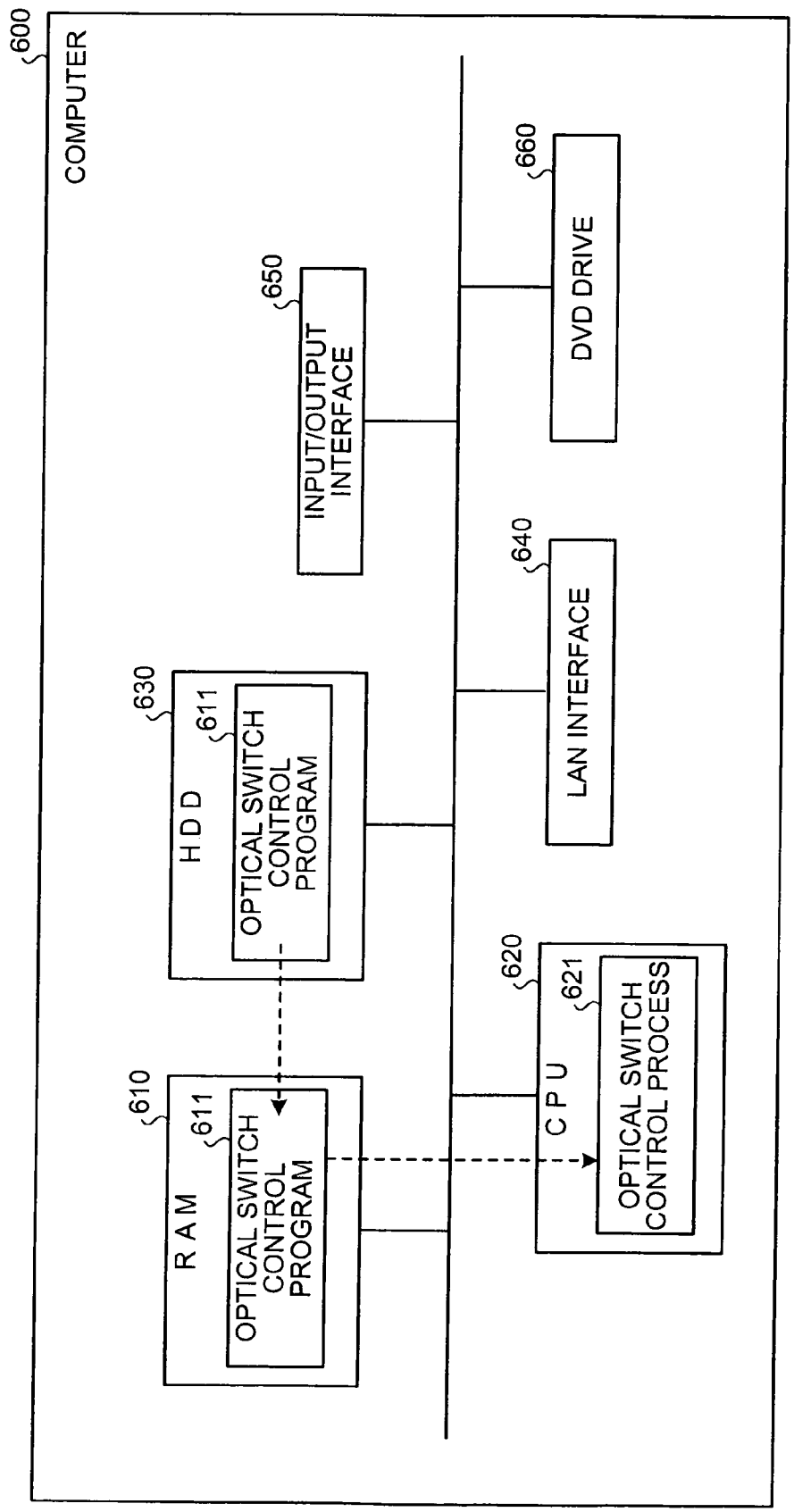
FIG. 26 is a block diagram of a constitution of a computer that executes an optical switch control program according to the first to the fifth embodiments.

FIG. 26 is a block diagram of a constitution of the computer that executes the optical switch control program according to the first to the fifth embodiments. As shown in the figure, a computer 600 includes a Random Access Memory (RAM) 610, a Central Processing Unite (CPU) 620, a Hard Disk Drive (HDD) 630, a LAN interface 640, an input/output interface 650, and a Digital Versatile Disk (DVD) driver 660.

The RAM 610 is a memory that stores a program and a result during execution of the program. The CPU 620 is a central processing unit that reads out the program from the RAM 610 and executes the program.

The HDD 630 is a disk device that stores a program and data. The LAN interface 640 is an interface for connecting the computer 600 to other computers through a LAN. The computer that executes the optical switch control program is connected to an optical switch by the LAN interface 640.

The input/output interface 650 is an interface for connecting an input device such as a mouse or a keyboard and a display device. The DVD drive 660 is a device that writes data in and reads out data from a DVD.

An optical switch control program 611 executed in the computer 600 is stored in the DVD, read out from the DVD by the DVD drive 660, and installed in the computer 600.

Alternatively, the optical switch control program 611 is stored in databases or the like of other computer systems connected via the LAN interface 640, read out from the databases, and installed in the computer 600.

The optical switch control program 611 installed is stored in the HDD 630, read out to the RAM 610, and executed by the CPU 620 as an optical switch control process 621.

According to the present invention, the information apparatuses belonging to the different sub-networks are connected to the physical wiring switching device. Apparatus information of the information apparatuses belonging to the different sub-networks are acquired. Thus, there is an effect that it is possible to acquire, in a network including a plurality of different sub-networks, apparatus information from information apparatuses belonging to the respective sub-networks.

Moreover, network addresses that make it possible to communicate with the information apparatuses belonging to the different sub-networks are stored. A network address of the physical wiring control device is changed based on the network addresses stored to acquire apparatus information of the information apparatuses belonging to the different sub-networks. Thus, there is an effect that, even when information apparatuses belonging to different sub-networks are connected to the physical wiring switching device, it is possible to automatically acquire apparatus information from the respective information apparatuses.

Furthermore, the connection ports having different network addresses set therein are provided. Connection ports capable of communicating with the information apparatuses belonging to the different sub-networks are stored. A connection ports used for communication is selected from the connection ports based on the stored connection port to acquire apparatus information of the information apparatuses belonging to the different sub-networks. Thus, there is an effect that, even when information apparatuses belonging to different sub-networks are connected to the physical wiring switching device, it is possible to automatically acquire apparatus information from the respective information apparatuses.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A physical wiring control device that controls a physical wiring switching device that connects a plurality of information apparatuses belonging to different sub-networks to perform connection switching among the information apparatuses, comprising:
   a plurality of connection ports;
   a control device port setting unit that changes a network address of a connection port of the physical wiring switching device; and
   an apparatus information acquiring unit that acquires apparatus information of each of the information apparatuses, wherein
   the control device port setting unit changes a network address of a plurality of connection ports to a network address corresponding to each of the information apparatuses connected to the respective connection ports when the apparatus information acquiring unit acquires apparatus information of the information apparatuses.

2. The physical wiring control device according to claim 1, further comprising a network address storing unit that stores therein network addresses required for performing communications with the information apparatuses, wherein the control device port setting unit changes the network address of the physical wiring control device based on the network addresses stored in the network address storing unit.

3. The physical wiring control device according to claim 1, further comprising:
- a connection-port-information storing unit that stores therein connection port information about connection ports through which it is possible to communicate with the information apparatuses, wherein
- the plurality of connection ports have different network addresses set therein, and
- the apparatus information acquiring unit acquires the apparatus information of the information apparatuses by selecting a connection port used for communication out of the connection ports based on the connection port information stored in the connection-port-information storing unit.

4. The physical wiring control device according to claim 1, wherein
- an address converter that converts a network address according to the information apparatuses is connected to the physical wiring switching device, and
- the apparatus information acquiring unit acquires apparatus information of the information apparatuses by converting a network address of the physical wiring control device using the address converter.

5. The physical wiring control device according to claim 1, wherein the information apparatuses transmit network signals when the information apparatuses are connected to the physical wiring switching device, and
- the apparatus information acquiring unit acquires apparatus information of the information apparatuses by detecting the network signals.

6. The physical wiring control device according to claim 1, wherein
- an addressing device that gives network addresses to the information apparatuses is connected to the physical wiring switching device, and
- the apparatus information acquiring unit connects the information apparatuses and the addressing device according to the information apparatuses and acquires apparatus information of the information apparatuses by referring to the addressing device.

7. The physical wiring control device according to claim 1, further comprising an apparatus connection judging unit that stores therein apparatus information acquired by the apparatus information acquiring unit and judges whether connection is possible among the information apparatuses connected to the physical wiring switching device based on the apparatus information.

8. The physical wiring control device according to claim 7, wherein
- an address converter that converts network addresses of the information apparatuses is connected to the physical wiring switching device, and
- the apparatus connection judging unit judges whether connection is possible among the information apparatuses connected to the physical wiring switching device and, when it is judged that connection is impossible, connects the information apparatuses via the address converter.

9. A method of controlling a physical wiring switching device that connects a plurality of information apparatuses belonging to different sub-networks to perform connection switching among the information apparatuses, comprising:
- changing a network address of a connection port of the physical wiring switching device; and
- acquiring apparatus information of each of the information apparatuses, wherein
- the changing changes a network address of a plurality of connection ports to a network address corresponding to each of the information apparatuses connected to the respective connection ports when the acquiring apparatus acquires apparatus information of the information apparatuses.

10. A computer-readable recording medium that stores therein a computer program that causes a computer to implement a method of controlling a physical wiring switching device that connects a plurality of information apparatuses belonging to different sub-networks to perform connection switching among the information apparatuses, the computer program causing the computer to execute:
- changing a network address of a connection port of the physical wiring switching device; and
- acquiring apparatus information of each of the information apparatuses, wherein
- the changing changes a network address of a plurality of connection ports to a network address corresponding to each of the information apparatuses connected to the respective connection ports when the acquiring acquires apparatus information of the information apparatuses.

* * * * *